(12) United States Patent
Woo et al.

(10) Patent No.: US 11,093,920 B2
(45) Date of Patent: Aug. 17, 2021

(54) SYSTEMS AND METHODS FOR PROGRAMMATICALLY GROUPING CONSUMER DEVICES INTO STABLE SPATIAL CLUSTERS

(71) Applicant: Groupon, Inc., Chicago, IL (US)

(72) Inventors: Geoffrey Hubert Woo, San Francisco, CA (US); Mahmudul Arefin Din, San Francisco, CA (US); Robert James Skillington, San Francisco, CA (US); Michael Chen, San Francisco, CA (US); Tihomir Tsankov Georgiev, Menlo Park, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 16/816,072

(22) Filed: Mar. 11, 2020

(65) Prior Publication Data

US 2020/0320498 A1  Oct. 8, 2020

Related U.S. Application Data

(63) Continuation of application No. 14/495,754, filed on Sep. 24, 2014, now Pat. No. 10,628,815.
(Continued)

(51) Int. Cl.
| | | |
|---|---|---|
| *G06Q 20/20* | (2012.01) | |
| *G06Q 20/22* | (2012.01) | |
| *H04W 40/24* | (2009.01) | |
| *G06Q 20/32* | (2012.01) | |
| *G06Q 20/04* | (2012.01) | |
| *G06Q 20/06* | (2012.01) | |
| *G06Q 20/30* | (2012.01) | |

(52) U.S. Cl.
CPC ........... *G06Q 20/202* (2013.01); *G06Q 20/04* (2013.01); *G06Q 20/0655* (2013.01); *G06Q 20/20* (2013.01); *G06Q 20/227* (2013.01); *G06Q 20/30* (2013.01); *G06Q 20/3226* (2013.01); *H04W 40/244* (2013.01)

(58) Field of Classification Search
CPC .. G06Q 20/3224; G06Q 20/20; G06Q 20/327; G06Q 20/00; G06Q 30/0261; G06Q 20/405; G06Q 50/01; G06Q 20/12
See application file for complete search history.

(56) References Cited

U.S. PATENT DOCUMENTS

| | | |
|---|---|---|
| 6,347,095 B1 | 2/2002 | Tang et al. |
| 6,711,409 B1 | 3/2004 | Zavgren et al. |

(Continued)

*Primary Examiner* — Peter Ludwig
(74) *Attorney, Agent, or Firm* — Alston & Bird LLP

(57) ABSTRACT

Systems, apparatus, methods, and non-transitory media for programmatically grouping consumer devices into stable spatial clusters are discussed herein. Some embodiments may include a point-of-sale system including a first consumer device of a stable spatial cluster of consumer devices to serve as a communication beacon. The first consumer device, that serves as the communication beacon, is configured to transmit and receive signals between a server and the other consumer devices of the stable spatial cluster of consumer devices. The other consumer devices receive a beacon identifier from the first consumer device and are thereby associated with a point-of-sale order to facilitate suitable point-of-sale functionality that may be provided via the first consumer device.

20 Claims, 15 Drawing Sheets

Related U.S. Application Data

(60) Provisional application No. 61/883,846, filed on Sep. 27, 2013.

(56) References Cited

U.S. PATENT DOCUMENTS

| | | | |
|---|---|---|---|
| 7,324,957 B2 | 1/2008 | Boys | |
| 7,416,117 B1 | 8/2008 | Morrison | |
| 7,899,583 B2 | 3/2011 | Mendelson | |
| 8,229,458 B2 | 7/2012 | Busch | |
| 8,238,308 B2 * | 8/2012 | Jeon | H04W 84/20 370/331 |
| 8,498,900 B1 | 7/2013 | Spirin et al. | |
| 8,750,901 B1 | 6/2014 | Gupta et al. | |
| 9,485,714 B2 * | 11/2016 | Zhou | H04W 4/08 |
| 9,576,286 B1 | 2/2017 | Artman et al. | |
| 9,615,347 B1 | 4/2017 | Kerr et al. | |
| 9,674,684 B1 | 6/2017 | Mendelson | |
| 9,760,871 B1 | 9/2017 | Pourfallah et al. | |
| 10,003,642 B2 * | 6/2018 | Vandwalle | H04W 56/0015 |
| 2002/0034946 A1 * | 3/2002 | Davies | H04W 84/18 455/436 |
| 2003/0132298 A1 | 7/2003 | Swartz et al. | |
| 2005/0096084 A1 | 5/2005 | Pohja et al. | |
| 2005/0288069 A1 * | 12/2005 | Arunan | H04W 52/0216 455/574 |
| 2007/0143207 A1 | 6/2007 | Breen | |
| 2007/0244750 A1 | 10/2007 | Grannan et al. | |
| 2007/0285237 A1 | 12/2007 | Batra et al. | |
| 2008/0122227 A1 | 5/2008 | Hammerle | |
| 2008/0283599 A1 | 11/2008 | Rasband et al. | |
| 2009/0255195 A1 | 10/2009 | Bridgman et al. | |
| 2009/0299788 A1 | 12/2009 | Huber et al. | |
| 2010/0009643 A1 | 1/2010 | Haartsen | |
| 2010/0057541 A1 | 3/2010 | Bonner et al. | |
| 2011/0035270 A1 | 2/2011 | Matsunaga et al. | |
| 2011/0154049 A1 | 6/2011 | Hsieh | |
| 2012/0063427 A1 | 3/2012 | Kandekar et al. | |
| 2012/0136754 A1 | 5/2012 | Underwood | |
| 2012/0158513 A1 | 6/2012 | Schoen et al. | |
| 2012/0252418 A1 | 10/2012 | Kandekar et al. | |
| 2012/0316953 A1 | 12/2012 | Ramchandani et al. | |
| 2012/0323685 A1 | 12/2012 | Ullah | |
| 2013/0041752 A1 | 2/2013 | Crum | |
| 2013/0173470 A1 * | 7/2013 | Nuzzi | G06Q 20/3224 705/44 |
| 2013/0216102 A1 | 8/2013 | Ryan et al. | |
| 2014/0011531 A1 * | 1/2014 | Burstrom | H04L 5/0035 455/509 |
| 2014/0032297 A1 | 1/2014 | Germann et al. | |
| 2014/0052615 A1 | 2/2014 | Andersen | |
| 2014/0108108 A1 * | 4/2014 | Artman | G06Q 20/32 705/14.1 |
| 2014/0108247 A1 | 4/2014 | Artman et al. | |
| 2014/0113674 A1 * | 4/2014 | Joseph | H04W 4/021 455/519 |
| 2014/0122334 A1 | 5/2014 | Lucas et al. | |
| 2014/0155098 A1 | 6/2014 | Markham et al. | |
| 2014/0171119 A1 | 6/2014 | Fraccaroli | |
| 2014/0188733 A1 | 7/2014 | Granbery | |
| 2014/0210616 A1 | 7/2014 | Ramachandran | |
| 2014/0218202 A1 | 8/2014 | Wilson et al. | |
| 2014/0229375 A1 | 8/2014 | Zaytzsev et al. | |
| 2014/0250174 A1 | 9/2014 | Zamer | |
| 2014/0258007 A1 | 9/2014 | Calman et al. | |
| 2014/0258028 A1 | 9/2014 | Bynum et al. | |
| 2014/0279014 A1 | 9/2014 | Roka et al. | |
| 2014/0279101 A1 | 9/2014 | Duplan et al. | |
| 2014/0279411 A1 | 9/2014 | Bertanzetti et al. | |
| 2014/0279498 A1 | 9/2014 | Qaim-Maqami et al. | |
| 2014/0286321 A1 | 9/2014 | Balian et al. | |
| 2014/0341043 A1 | 11/2014 | Prydekker et al. | |
| 2015/0006633 A1 * | 1/2015 | Vandwalle | H04L 67/1051 709/204 |
| 2015/0025983 A1 | 1/2015 | Cicerchi | |
| 2015/0066651 A1 | 3/2015 | Hu et al. | |
| 2015/0073925 A1 | 3/2015 | Renfroe | |
| 2015/0154597 A1 | 6/2015 | Bacastow | |
| 2015/0278830 A1 | 10/2015 | Zamer et al. | |
| 2020/0250648 A1 * | 8/2020 | Sanchez | G06Q 20/3223 |

* cited by examiner

SYSTEMS AND METHODS FOR PROGRAMMATICALLY GROUPING CONSUMER DEVICES INTO STABLE SPATIAL CLUSTERS

CROSS REFERENCE TO RELATED APPLICATIONS

This application is a continuation of U.S. Nonprovisional application Ser. No. 14/495,754, filed on Sep. 24, 2014, now U.S. Pat. No. 10,628,815, which claims the benefit of and priority to U.S. Provisional Patent Application No. 61/883,846, titled "Systems and Methods for Programmatically Grouping Consumers," filed Sep. 27, 2013, the contents of which are hereby incorporated by reference in their entireties.

FIELD

Embodiments of the invention relate, generally, to techniques for providing point-of-sale functionality to groups of consumers.

BACKGROUND

Merchants provide products, services, or experiences to consumers at merchant shops via point-of-sale systems. Some merchants (e.g., as dine-in restaurants) may serve multiple groups of consumers at a single time (e.g., groups associated with a table, check, order, party, etc.). In this regard, areas for improving current systems have been identified.

BRIEF SUMMARY

Through applied effort, ingenuity, and innovation, solutions to improve such systems have been realized and are described herein. Some embodiments may provide for a system configured to programmatically group consumers. For example, the system may include a communication beacon and a merchant device. The communication beacon may be configured to broadcast a beacon identifier via a wireless personal area network (PAN) to consumer devices located within a direct wireless communicable range of the communication beacon. The merchant device may include communication circuitry and processing circuitry. The communication circuitry configured to connect with a server via a network connection separate from the wireless PAN. The processing circuitry may be configured to: receive an indication that a consumer device received the beacon identifier broadcast by the communication beacon, wherein the indication is received from at least one of the consumer device, the communication beacon, and the server; in response to receiving the indication that the consumer device received the beacon identifier: identify, based on communication with the server via the network, a consumer account record associated with the consumer device; create a point-of-sale order when the beacon identifier fails to be associated with an existing point-of-sale order; and associate the consumer account record with the point-of-sale order.

In some embodiments, the processing circuitry may be further configured to: determine a transaction price for the point-of-sale order; determine whether the consumer device has failed to be within a communicable range of the wireless PAN for a predetermined period of time; and in response to determining that the consumer device has failed to be within the communicable range of the wireless PAN for the predetermined period of time, facilitate a payment for a at least a portion of the transaction price by the consumer account record associated with the consumer device.

In some embodiments, the processing circuitry may be further configured to associate the beacon identifier with a location of the communication beacon.

In some embodiments, the communication beacon configured to broadcast the beacon identifier via the wireless PAN may include the communication beacon being configured to utilize a Bluetooth standard. In some embodiments, the merchant device may include the communication beacon.

In some embodiments, the processing circuitry may be further configured to receive an indication that the consumer device has maintained a wireless PAN connection with the communication beacon for a predetermined period of time before associating the consumer account record with the point-of-sale order.

In some embodiments, the processing circuitry may be further configured to determine the consumer device as being nearer to the communication beacon than one or more other communication beacons before associating the consumer account record with the point-of-sale order.

In some embodiments, the processing circuitry is further configured to: receive, from a second consumer device, an indication that the second consumer device received a second beacon identifier from a second communication beacon, wherein the second beacon identifier is different from the beacon identifier; identify a second consumer account record associated with the second consumer device; create a point-of-sale order when the beacon identifier fails to be associated with an existing point-of-sale order; and in response to receiving the indication that the second consumer device received the second beacon identifier, associate the second consumer account record with a second point-of-sale order.

In some embodiments, the processing circuitry may be further configured to: receive, from a second consumer device, an indication that the second consumer device received the beacon identifier from the communication beacon; determine whether a point-of-sale order has been associated with the beacon identifier; identify a second consumer account record associated with the second consumer device; and in response to determining that the point-of-sale order has been associated with the beacon identifier, associate the second consumer account record with the point-of-sale order.

In some embodiments, the communication beacon may be a second consumer device. The system may further include a root beacon configured to detect consumer devices within a communicable range of the root beacon. The second consumer device may be further configured to broadcast the beacon identifier after being detected by the root beacon. In some embodiments, the merchant device may include the root beacon. In some embodiments, the processing circuitry may be further configured to: receive location data from consumer devices indicating the location of the consumer devices; identify a stable spatial cluster of consumer devices based on the location data; identify consumer account records associated with the stable spatial cluster of consumer devices; and associate the consumer account records with the point-of-sale order.

Some embodiments may provide for a machine-implemented method for programmatically grouping consumers. The method may include: receiving, by processing circuitry of a merchant device, an indication that a consumer device received a beacon identifier from a communication beacon, wherein: the communication beacon is configured to broadcast the beacon identifier via a wireless personal area network (PAN) to consumer devices located within a direct wireless communicable range of the communication beacon; and the indication is received from at least one of the consumer device, the communication beacon, and a server; in response to receiving the indication that the consumer device received the beacon identifier, and by the processing circuitry: identifying, based on communication with the server via a network separate from the wireless PAN, a consumer account record associated with the consumer device; creating a point-of-sale order when the beacon identifier fails to be associated with an existing point-of-sale order; and associating the consumer account record with the point-of-sale order.

In some embodiments, the method may further include, by the processing circuitry: determining a transaction price for the point-of-sale order; determining whether the consumer device has failed to be within the communicable range of the wireless PAN for a predetermined period of time; and in response to determining that the consumer device has failed to be within the communicable range of the wireless PAN for the predetermined period of time, facilitating a payment for a at least a portion of the transaction price by the consumer account record associated with the consumer device.

In some embodiments, the method may further include, by the processing circuitry, associating the beacon identifier with a location of the communication beacon.

In some embodiments, the communication beacon configured to broadcast the beacon identifier via the wireless PAN may include the communication beacon being configured to utilize a Bluetooth standard.

In some embodiments, the method may further include, by the processing circuitry, receiving an indication that the consumer device has maintained the wireless PAN connection with the communication beacon for a predetermined period of time before associating the consumer account record with the point-of-sale order.

In some embodiments, the method may further include, by the processing circuitry, determining the consumer device as being nearer to the communication beacon than one or more other communication beacons before associating the consumer account record with the point-of-sale order.

In some embodiments, the method may further include, by the processing circuitry: detecting consumer devices within a communicable range of a root beacon; and providing a beacon identifier to a consumer device detected by the root beacon.

In some embodiments, the method may further include, by the processing circuitry: comprising, by the processing circuitry: receiving location data from consumer devices indicating location of the consumer devices; identifying a stable spatial cluster of consumer devices based on the location data; identifying consumer account records associated with the stable spatial cluster of consumer devices; and associating the consumer account records with the point-of-sale order.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
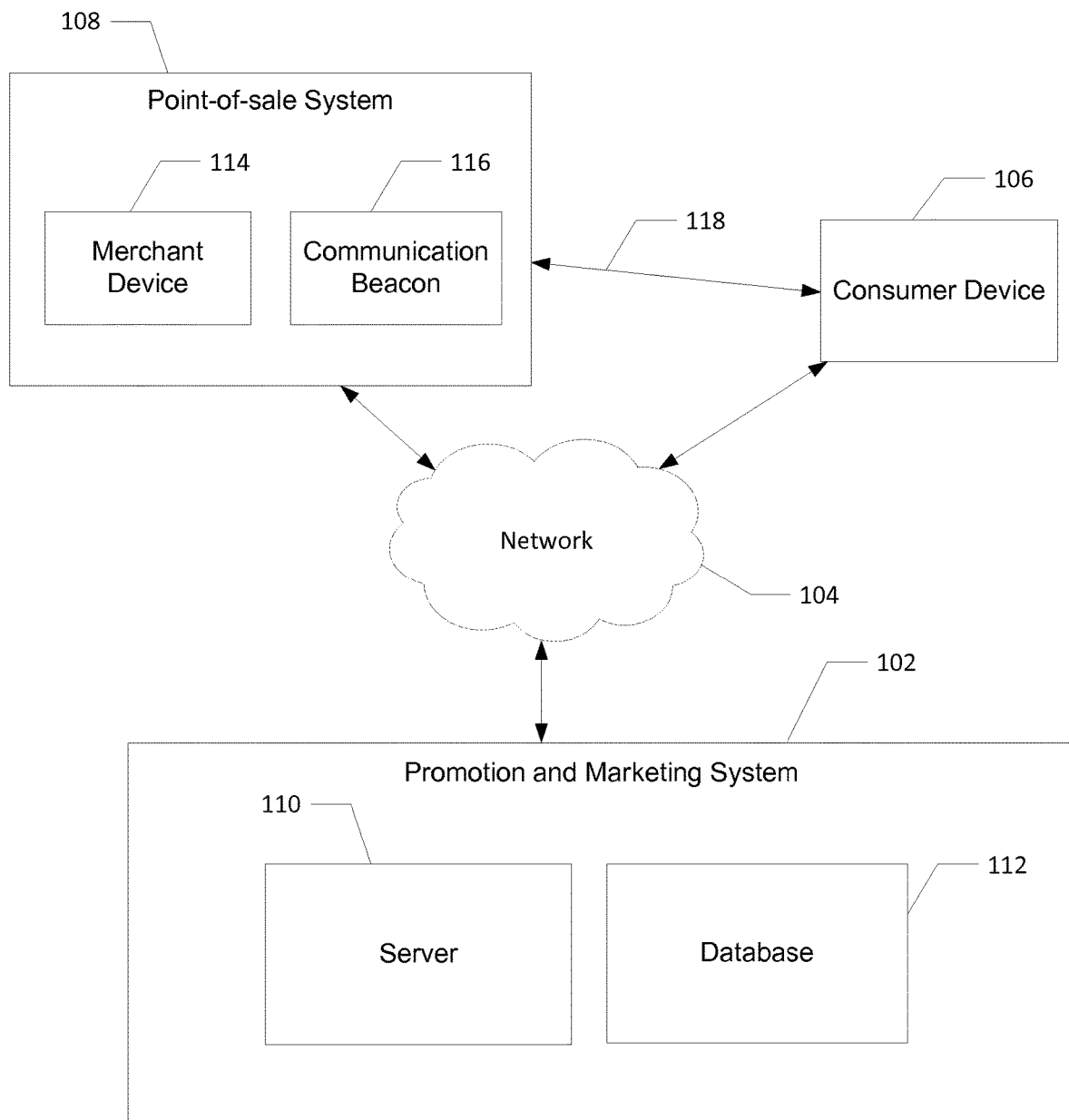
Figure 2:
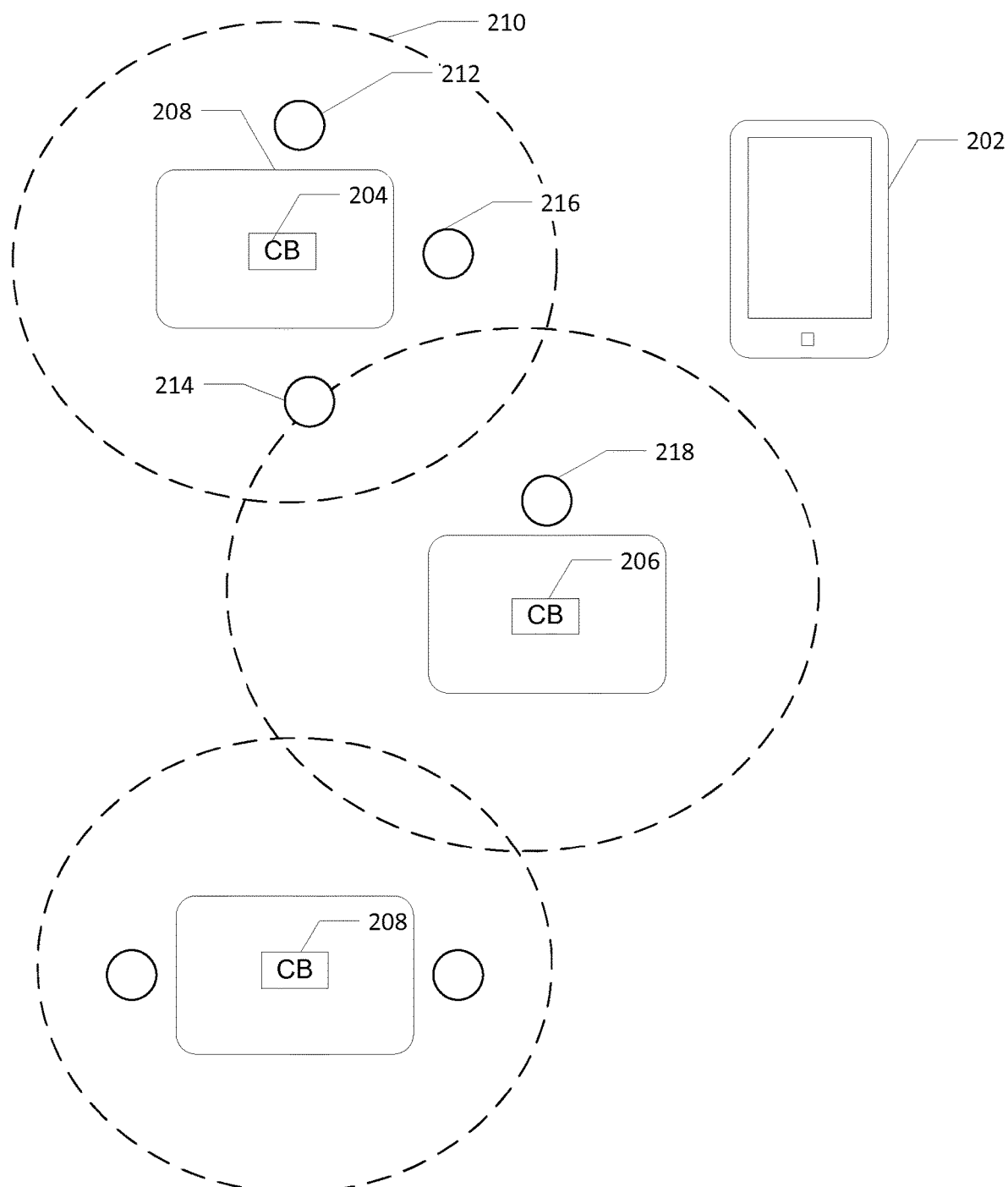
Figure 3:
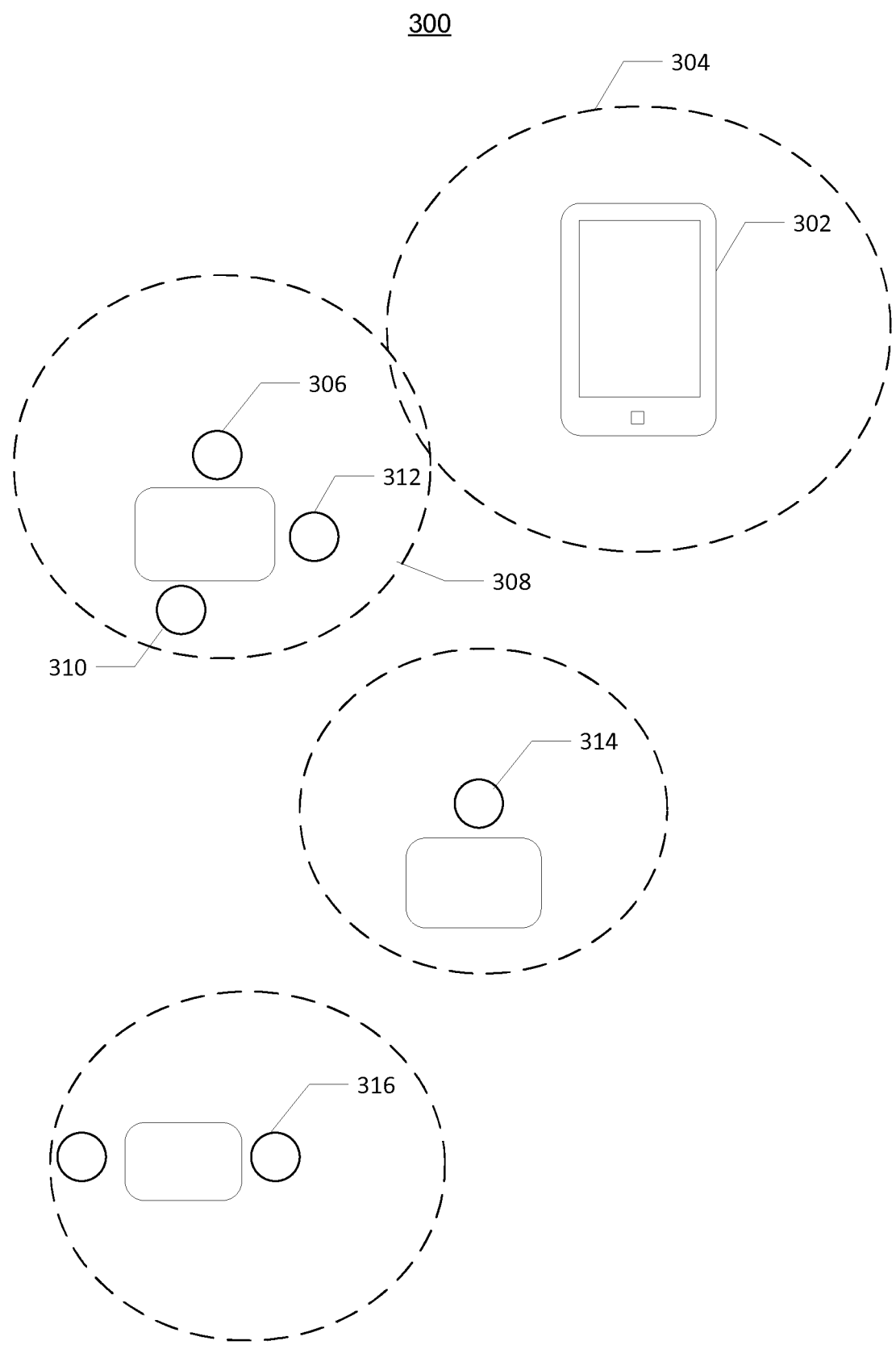
Figure 4:
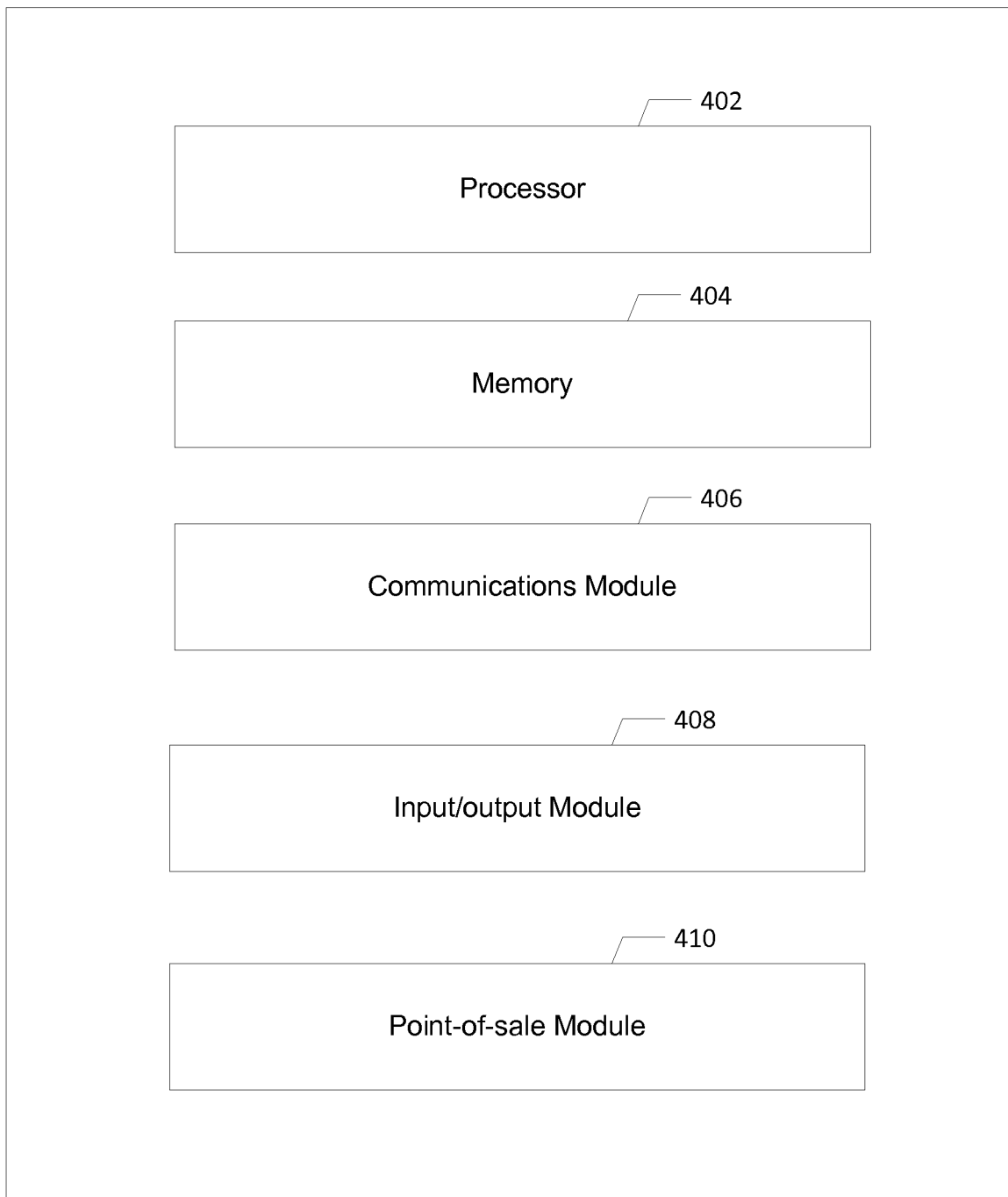
Figure 5:
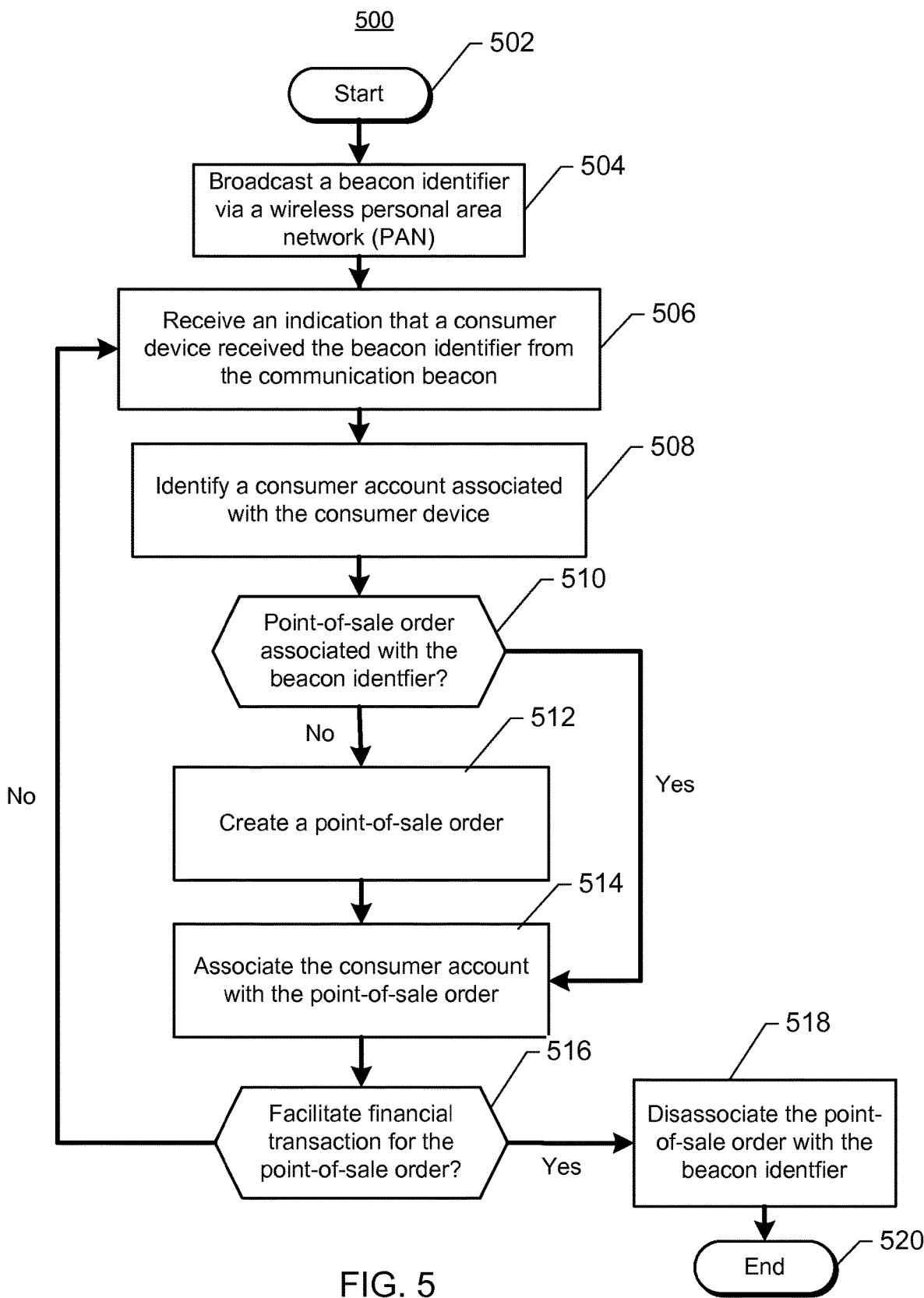
Figure 6:
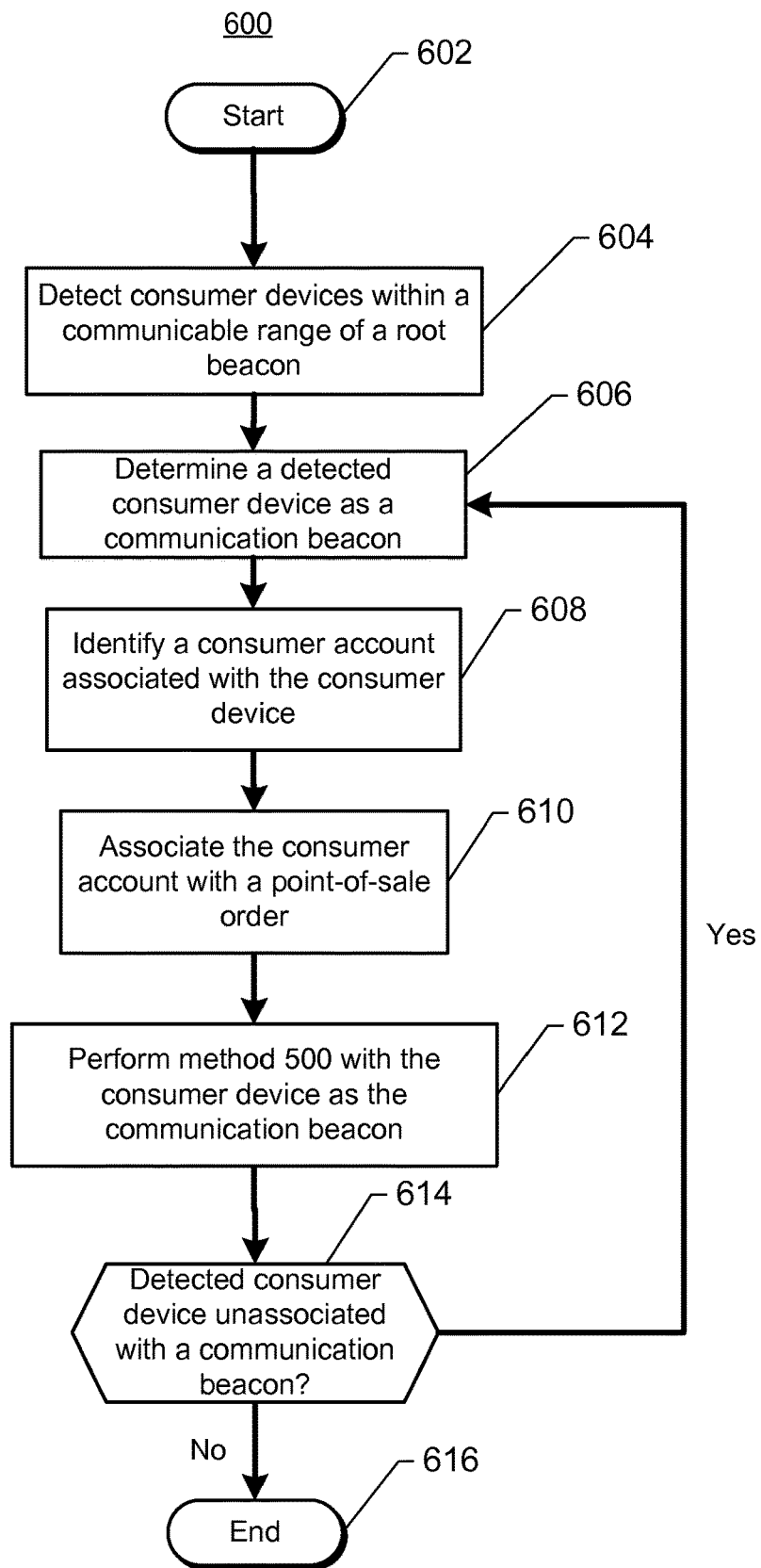
Figure 7:
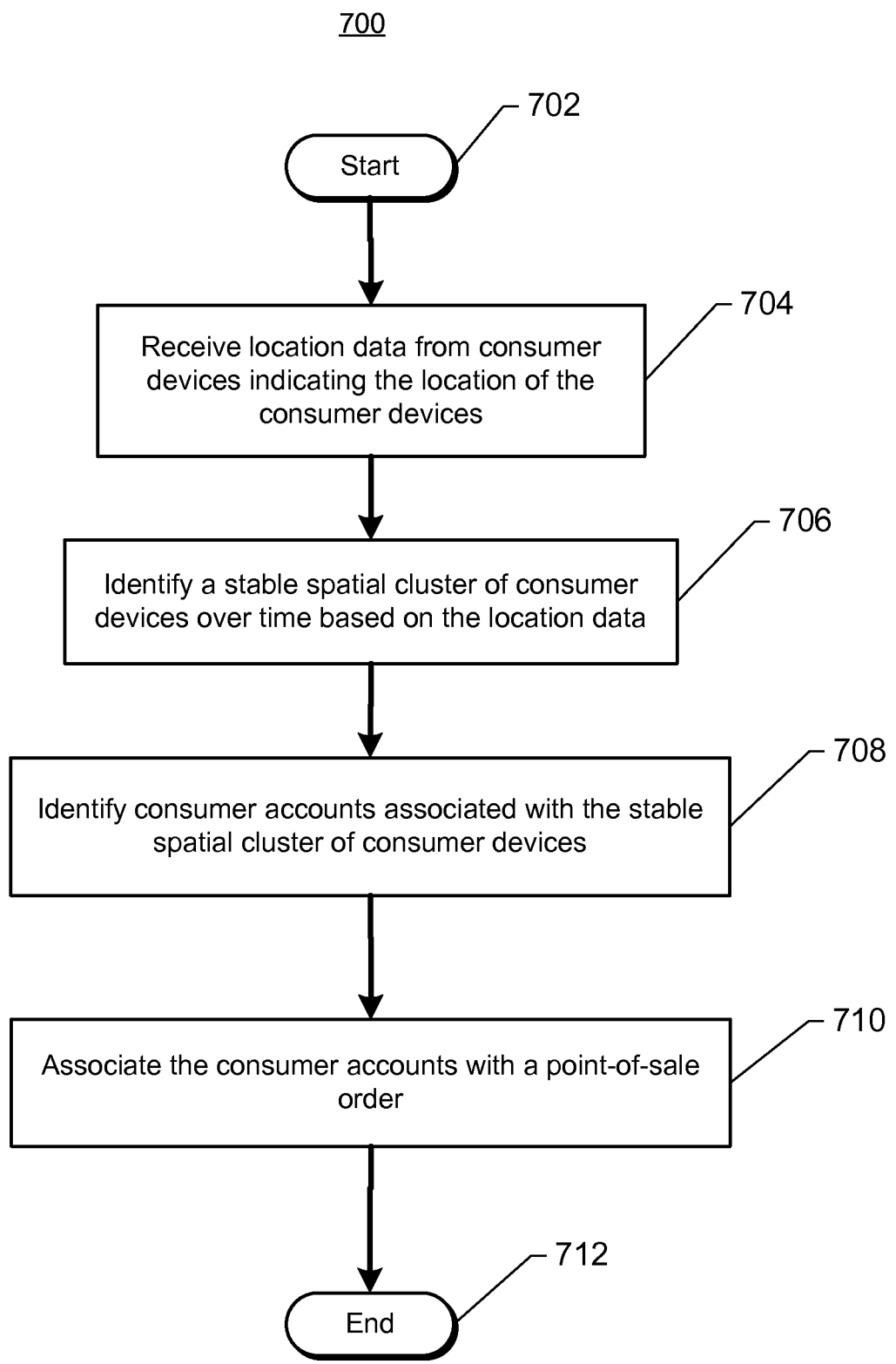
Figure 8:
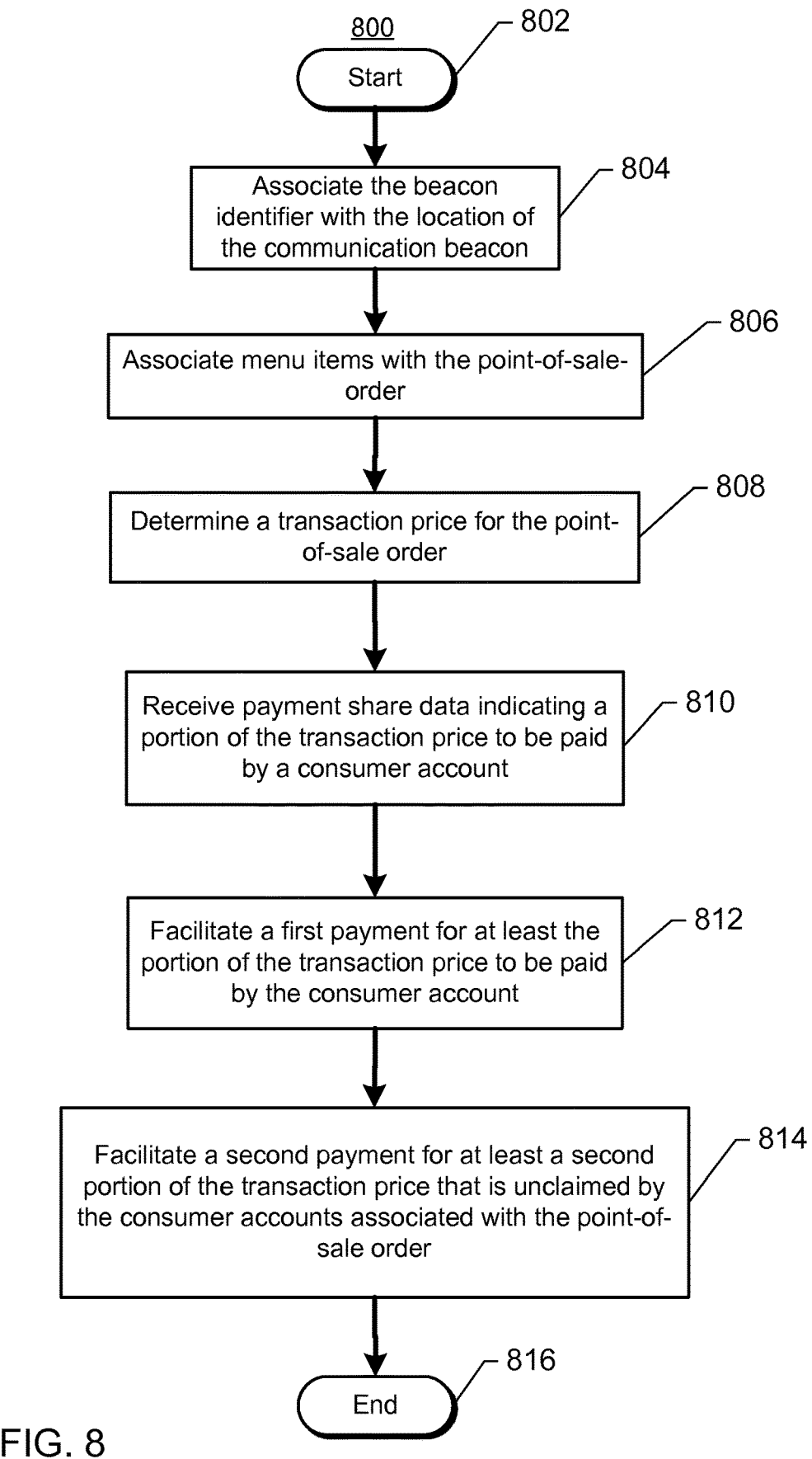
Figure 9:
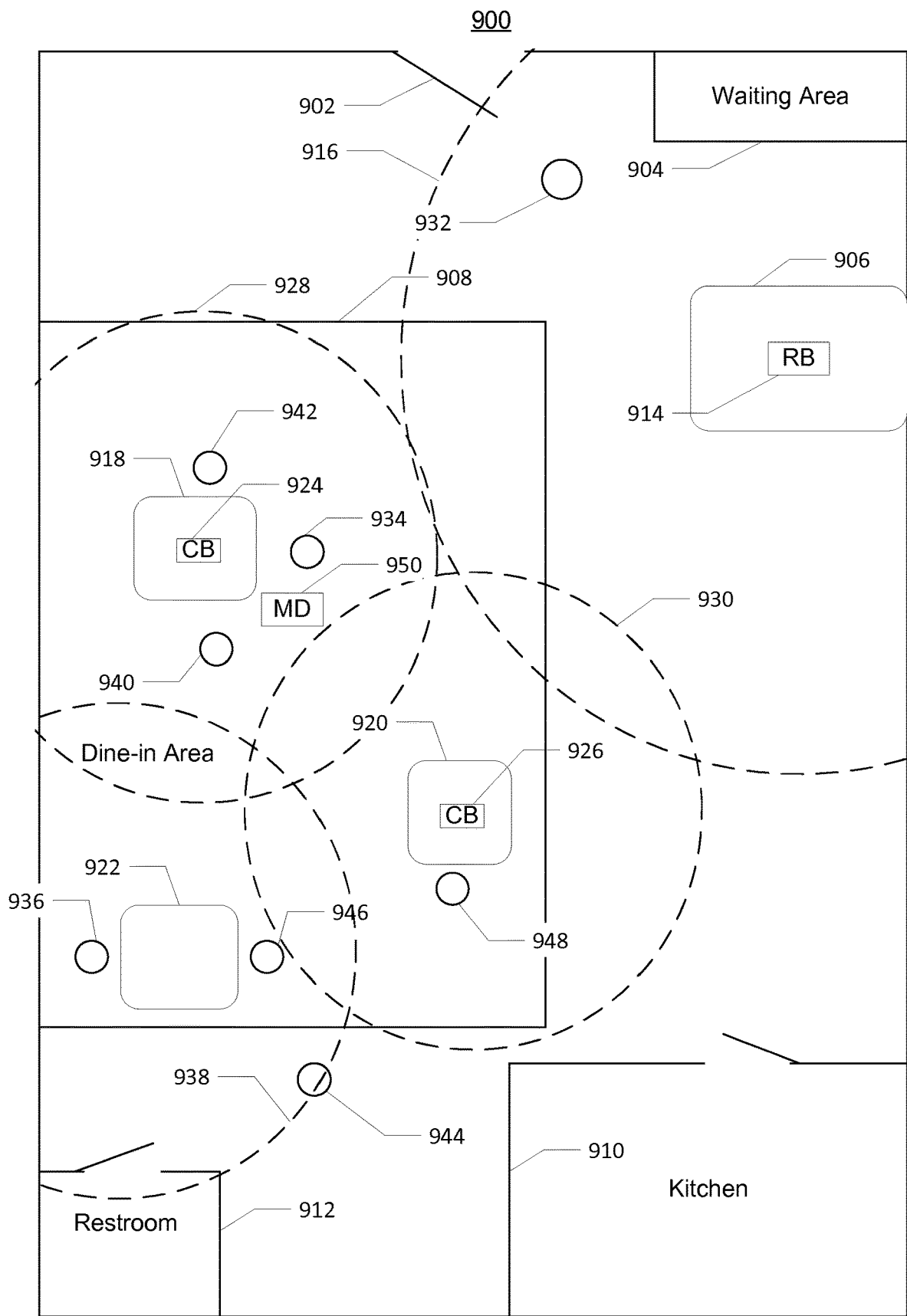
Figure 10:
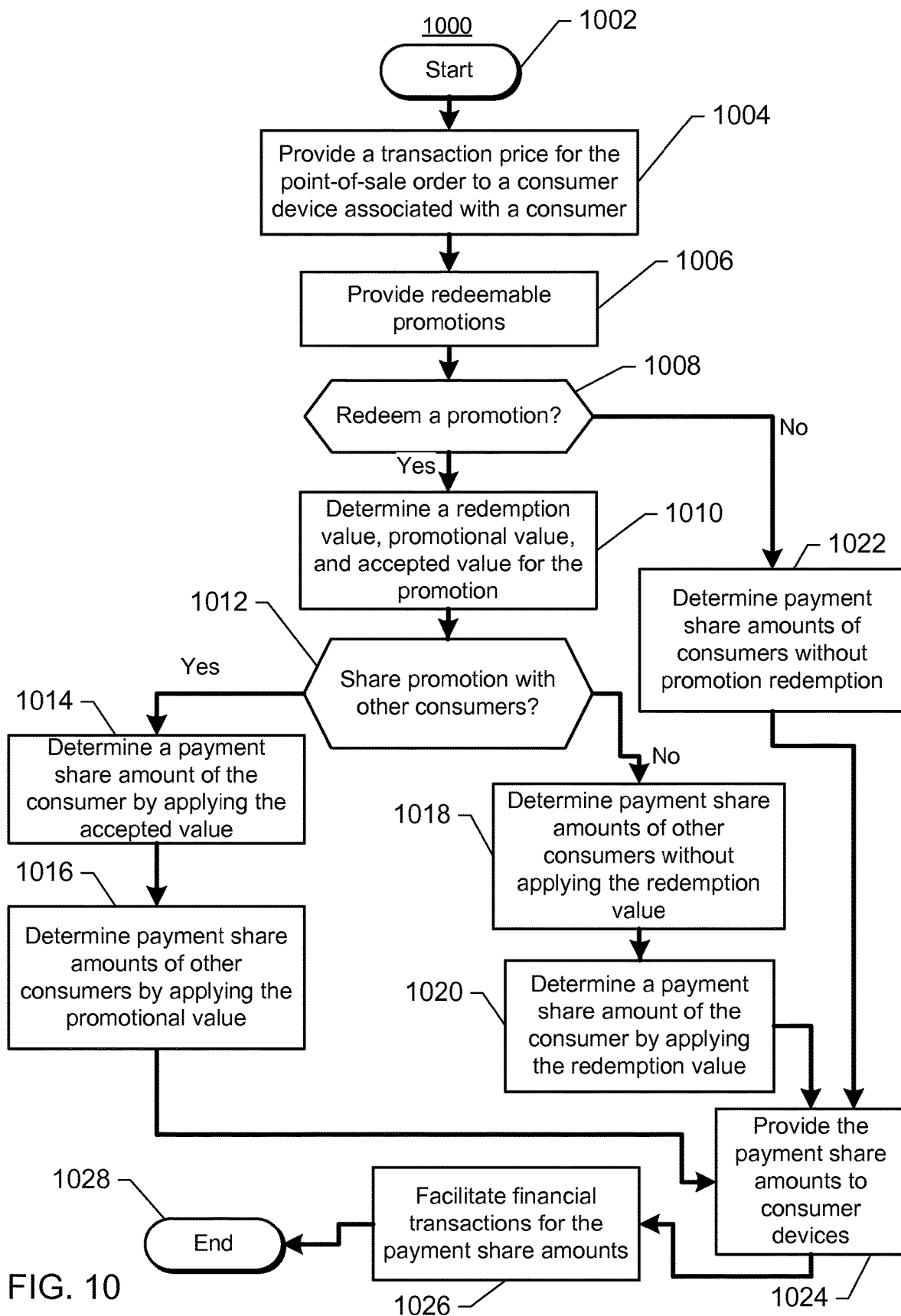
Figure 11:
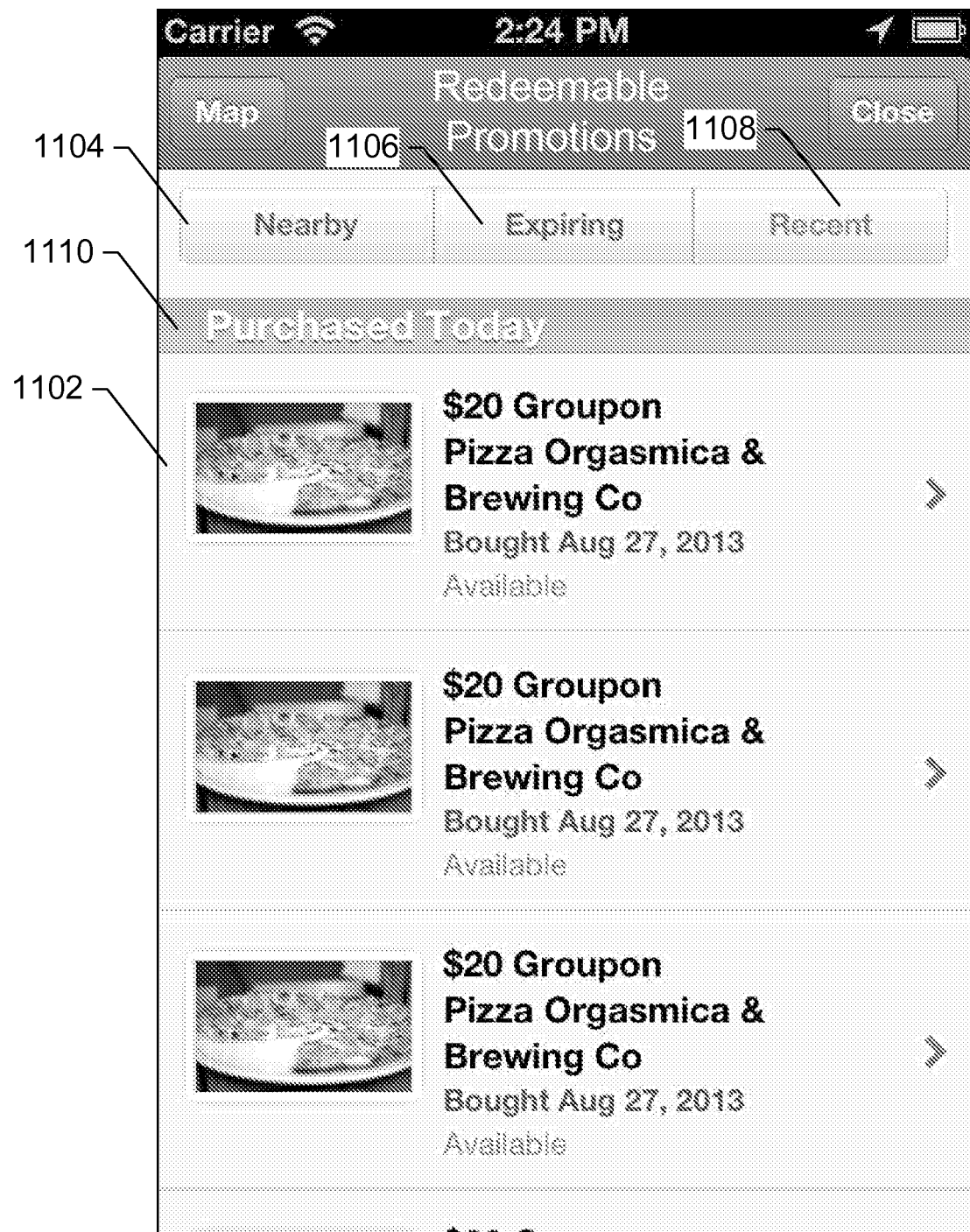
Figure 12:
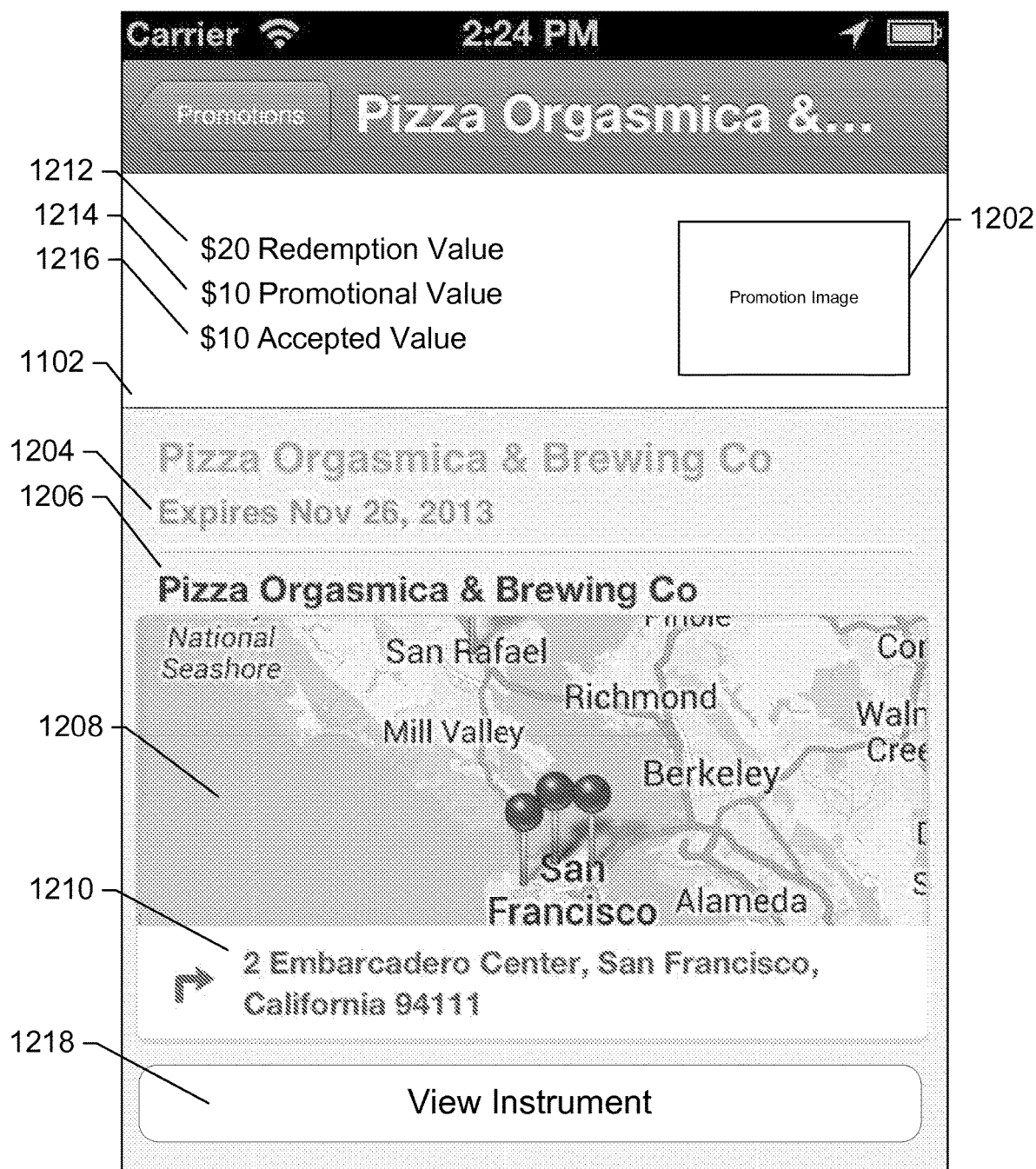
Figure 13:
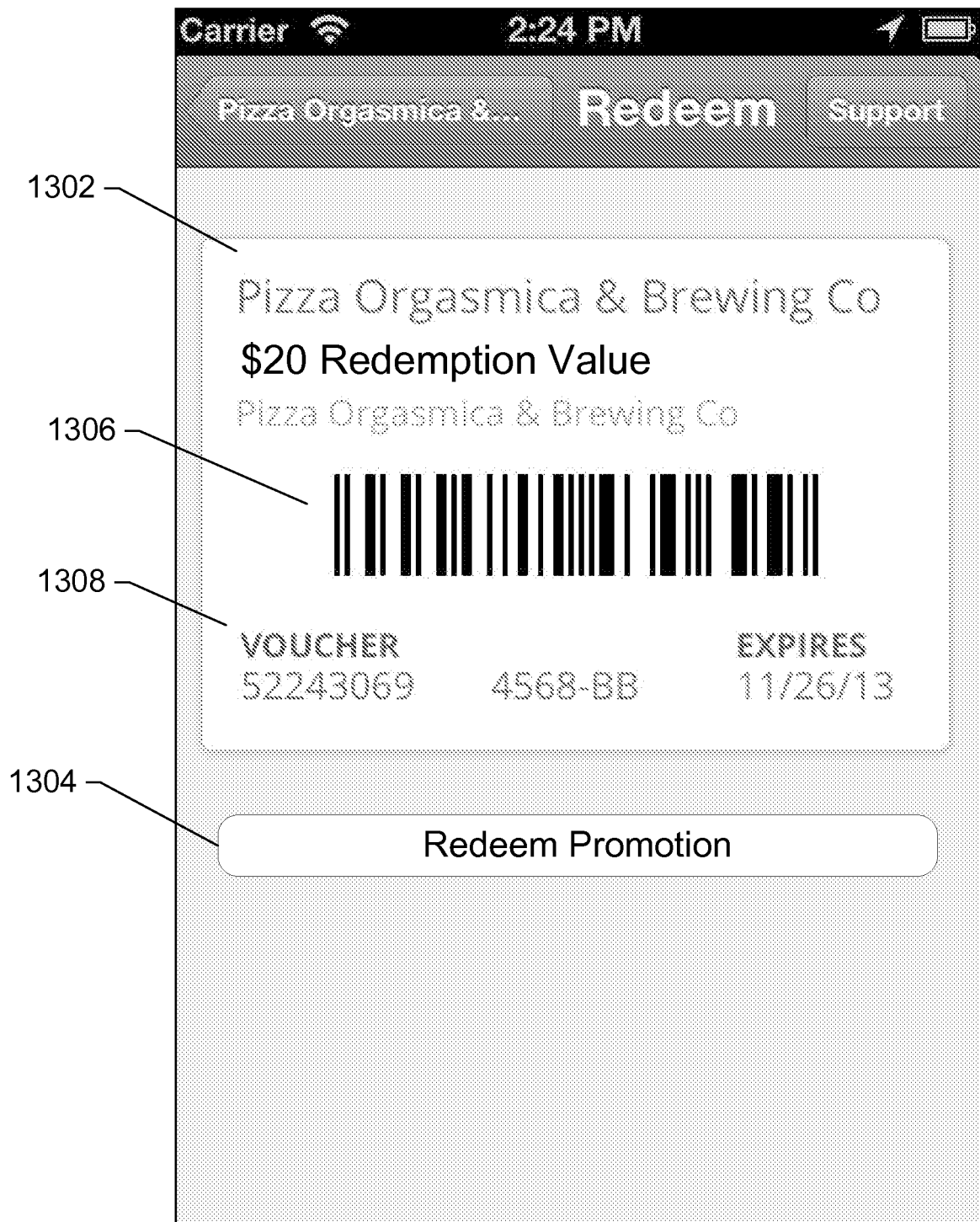
Figure 14:
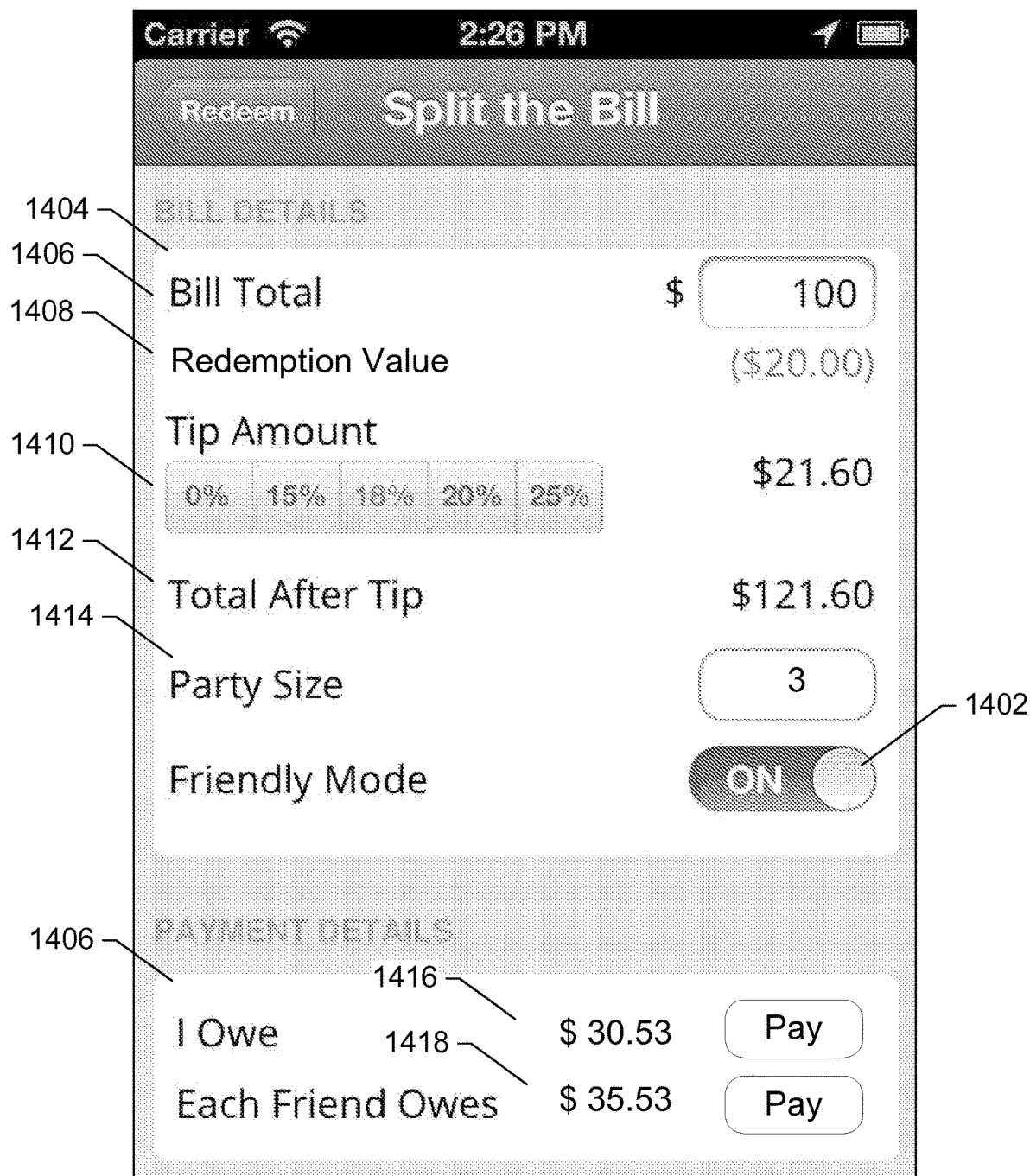
Figure 15:
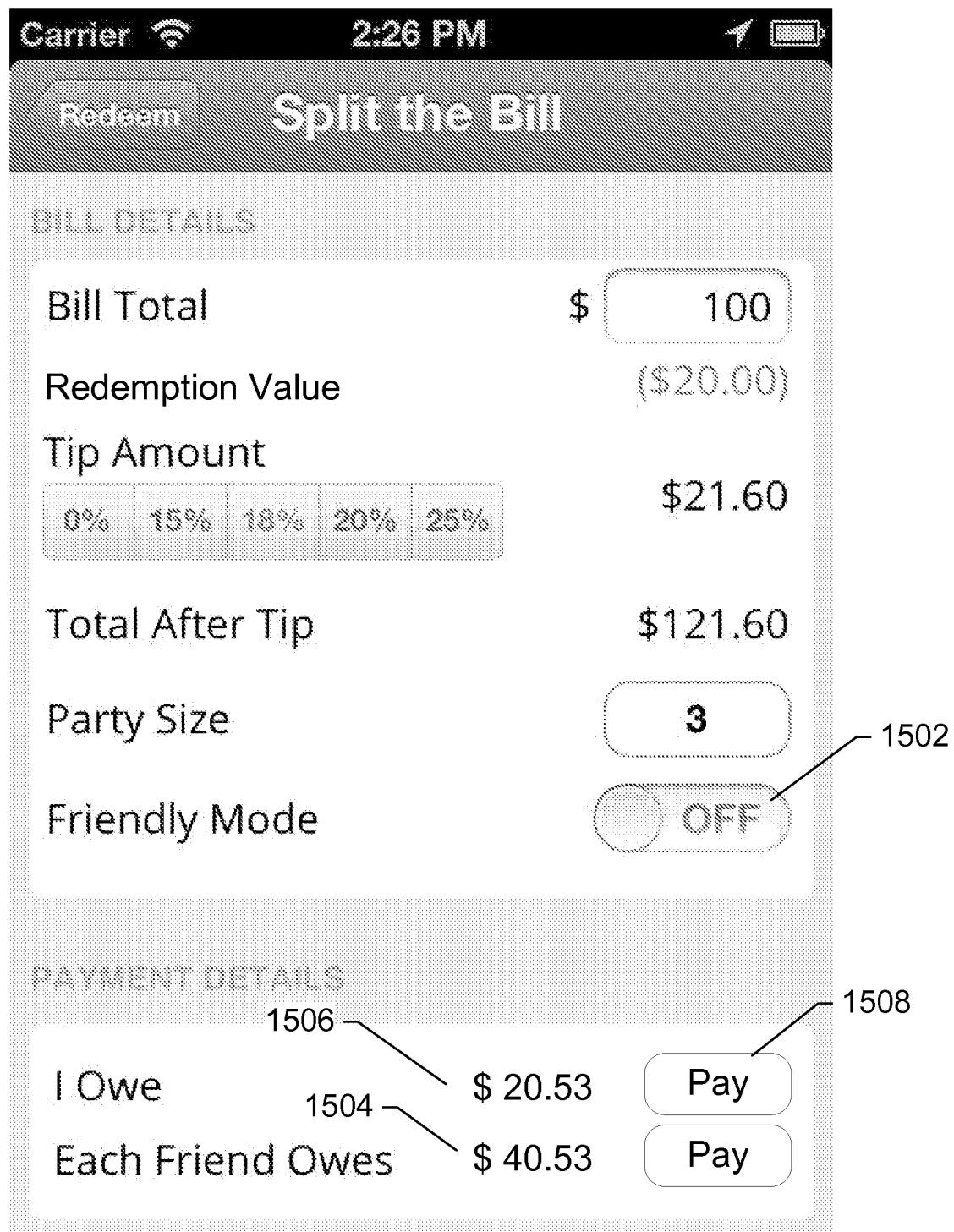

Having thus described some embodiments in general terms, reference will now be made to the accompanying drawings, which are not necessarily drawn to scale, and wherein:

FIG. 1 shows an example system, in accordance with some embodiments;

FIG. 2 shows an example point-of-sale system including communication beacons, in accordance with some embodiments;

FIG. 3 shows an example point-of-sale system including consumer device communication beacons, in accordance with some embodiments;

FIG. 4 shows example circuitry in accordance with some embodiments;

FIG. 5 shows an example of a method for programmatically grouping consumers, in accordance with some embodiments;

FIG. 6 shows an example of a method for programmatically grouping consumers based on peer-to-peer consumer devices, in accordance with some embodiments;

FIG. 7 shows an example of a method for programmatically grouping consumers based on location, in accordance with some embodiments;

FIG. 8 shows an example of a method for facilitating a financial transaction, in accordance with some embodiments;

FIG. 9 shows a floor plan of an example restaurant including a point-of-sale system, in accordance with some embodiments;

FIG. 10 shows an example of a method for facilitating shared payment for a point-of-sale order, in accordance with some embodiments;

FIG. 11 shows an example redeemable promotion display, in accordance with some embodiments;

FIG. 12 shows an example promotion detail display, in accordance with some embodiments;

FIG. 13 shows an example promotion instrument display, in accordance with some embodiments;

FIG. 14 shows an example split-the-bill display, in accordance with some embodiments; and FIG. 15 shows an example split-the-bill display, in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, or the like. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, device, apparatus, etc.) in some embodiments.

Methods, systems, apparatus and computer program products described herein may be operable for programmatically grouping consumers. For example, some embodiments may provide for a point-of-sale system in which consumers carrying consumer devices may be programmatically associated with an appropriate point-of-sale order. When deployed at a dine-in restaurant, for example, the point-of-sale system may allow consumers to simply take seats while providing for point-of-sale order creation, adding menu items to the order, matching orders to locations (e.g., tables, seats, and/or other dine-in locations), facilitating dine-in service, determining a total transaction price, and/or facilitating financial transactions (e.g., including promotion redemptions, tax, tip, etc.).

In some embodiments, the point-of-sale system may include a merchant device and one or more communication beacons. The communication beacons may be placed at locations of interest (e.g., at a merchant shop) and may be configured to broadcast different beacon identifiers. For example, multiple communication beacons may be placed within a dine-in restaurant (e.g., at each table) to form a mesh of signal coverage within the merchant shop. Nearby consumer devices that receive a beacon identifier from the same communication beacon may be determined to be associated with a common point-of-sale order and suitable point-of-sale functionality may be provided (e.g., associated consumers may be served as a dine-in party). Where consumer devices receive multiple beacon identifiers, the appropriate beacon identifier may be determined based on signal strength of the communications between the consumer device and each communication beacon.

In some embodiments, a peer consumer device may be selected (e.g., by the consumer and/or merchant device) as an ad hoc communication beacon for broadcasting a beacon identifier to other consumer devices. Here, the costs of dedicated communication beacons within a merchant shop may be avoided. For example, other consumer devices that are near a selected consumer device communication beacon may be associated with a common point-of-sale order. In some embodiments, multiple consumer device communication beacons may be used and selected by location to form an ad hoc mesh of signal coverage within a merchant shop. In some embodiments, consumer device communication beacons and associated consumer device(s) groups may be programmatically determined based on identifying spatially stable clusters of consumer devices over time (e.g., indicating that a group of consumers have taken a seat at a table). Here, a spatially stable cluster may be associated with a point-of-sale order.

Some embodiments may further provide for techniques for providing enhanced consumer service after consumers have been programmatically associated with a point-of-sale order. For example, the point-of-sale system may be configured to facilitate payments on behalf of consumers based on stored payment data associated with consumer accounts. In some embodiments, the consumer account may be provided by a central system that may be further configured to provide (e.g., secured) payment services, among other things (e.g., promotional messages, promotion redemptions, etc.).

Exemplary System Architecture

FIG. 1 shows an example system 100 in accordance with some embodiments. System 100 may include promotion and marketing system 102 (or "system 102"), network 104, consumer device 106, and point-of-sale system 108. System 102 may be communicably connected with consumer device 106 and point-of-sale system 108 via network 104.

Point-of-sale system 108 may include merchant device 114 and communication beacon 116. Point-of-sale system 108 may be associated with a merchant and may be located at a merchant shop. A "merchant," as used herein may include, but is not limited to, a promotion provider, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a merchant may take the form of a running company that sells attire that is generally used by a person who runs or participates in athletic activities. Although a single merchant device 114 and communication beacon 116 are shown, point-of-sale system 108 may include any number of merchant devices and/or communication beacons. In some embodiments, system 100 may further include multiple point-of-sale systems 108 that may be associated with various other merchants and/or merchant shops. In some embodiments, merchant device 114 may be configured to provide point-of-sale (POS) functionality for the merchant. Furthermore, merchant device 114 may be a stationary and/or mobile device. In some embodiments, merchant device 114 and/or communication beacon 116 may include circuitry configured to programmatically perform some or all of the methods discussed herein, such as methods 500-800 shown in FIGS. 5-8, respectively.

In some embodiments, system 100 may further include promotion and marketing system 102, which may further include server 110 and database 112. In some embodiments, system 102 may be configured to provide a promotion and marketing service that is accessible via one or more consumer devices and is operable to provide example promotion and/or marketing services on behalf of one or more merchants and/or providers that are offering one or more instruments that are redeemable for goods, services, experiences and/or the like. The promotion and marketing service maybe further be configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. Server 110 may include circuitry, networked processors, etc. configured to perform some or all of the server-based processes described herein and may be any suitable network server and/or other type of processing device. For example, server 110 may be configured to provide consumer accounts (e.g., including associated payment accounts of consumers that may be used with point-of-sale system 108), provide impressions or other advertising messages to consumer devices 108, and/or facilitate the offer, purchase, and/or redemption (e.g., at the merchant shop) of promotions. In some embodiments, system 102 may function as a "cloud" with respect to the consumer device 106 and/or point-of-sale system 108. In that sense, server 110 may include several servers performing interconnected and/or distributed functions. To avoid unnecessarily overcomplicating the disclosure, server 110 is shown and described herein as a single server.

In some embodiments, system 102 may be configured to receive promotion data indicating a promotion for goods and/or services and/or one or more parameters of the promotion (e.g., target audience, timing, purchase value, promotional value, residual value, etc.). System 102 may then generate and/or provide one or more impressions for the promotion to consumer device 102. A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. In some embodiments, a promotion (e.g., promotion data) may define an accepted value (e.g., a cost to purchase the promotion), a promotional value (e.g., the value of the resultant instrument beyond the accepted value), a redemption value (e.g., the value of the resultant instrument including the accepted value and the promotional value), a residual value (e.g., the value upon return or upon expiry of one or more redemption parameters), one or more redemptions parameters and/or the like. An "impression," as used herein, may include a communication, a display, or other perceived indication, such as a flyer, print media, email, text message, application alert, mobile applications, other type of electronic interface or distribution channel and/or the like, of one or more promotions. An "instrument," as used herein, may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience.

Database 112 may be any suitable network storage device. For example, database 112 may be configured to store promotion data (e.g., attributes of promotion), consumer data (e.g., attributes of the consumer such as profile information, preferences, purchase history, consumer behavior, payment accounts, among other things), and/or purchase transaction data (e.g., payment account information, credit card information, payment information, billing address, payment account information, among other things). As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer, such as a consumer with a consumer account provided by system 102. Although a single consumer device 106 is shown, system 100 may include any number of consumer devices that may be associated with various other consumers. Consumer device 106 may be a mobile device and/or a stationary device (e.g., home computer). For example, consumer device 106 may be a mobile device such as a cellular telephone (including smartphones and/or other types of mobile telephones), laptop, tablet, electronic reader, e-book device, media device, and/or the like.

In some embodiments, consumer device 106 may be configured to communicate with point-of-sale system 108 via connection 118. For example, merchant device 114 and/or communication beacon 116 may be configured to broadcast a beacon identifier via a wireless personal area network (PAN). In some embodiments, consumer device 106 may be configured to communicate with point-of-sale system 108 via the wireless PAN when consumer device 106 is within a communicable range of the wireless PAN. For example, communication beacon 116 may be configured to utilize a Bluetooth standard for the wireless communication such that Bluetooth-enable consumer devices 106 may wirelessly connect with communication beacon 116 upon coming within communicable range of communication beacon 116. The communicable range of communication beacon may be configured to be of a range that is suitable for low power (e.g., less than 2.5 mW), high resolution distance determination within a merchant shop and/or a portion of the merchant shop. For example, the communicable range of the communication beacon using a Bluetooth standard can be within 1-10 meters, or any other suitable short range (e.g., 2, 3, 4 . . . 10, 11, etc. meters). In some embodiments, the communicable range may be configured based on the dimensions, layout, and/or other needs of a merchant shop.

FIG. 2 shows an example point-of-sale system 200 including one or more communication beacons, in accordance with some embodiments. Point-of-sale system 200 may be deployed at a merchant shop, which in some examples, may be a dine-in restaurant. Point-of-sale system 200 may include merchant device 202 and communication beacons 204, 206, and 208. Communication beacons 204, 206, and 208 may be each located at locations of interest within the merchant shop. Here, for example, each communication beacon may be located at and/or near a dine-in location, such as a table 208, thereby forming a mesh of signal coverage within the dine-in locations. The communication beacons may be each configured to broadcast a beacon identifier via a wireless PAN, such as wireless PAN 210 for communication beacon 204. The "beacon identifier," as used herein, may refer to any type of data that may be used to uniquely identify communication beacons from each other. In some embodiments, a beacon identifier may include a unique identification number (i.e., a unique ID, a serial number, etc.), or may be based at least partially on, a random or pseudorandom code.

As discussed in greater detail with respect to method 500 shown in FIG. 5, merchant device 202 may be configured to group consumers based on consumer devices being within a proximity to a communication beacon. For example, consumer devices 212, 214 and 216 may be associated with a point-of-sale order based on the consumer devices being near communication beacon 204 (e.g., within wireless PAN 210). In another example, consumer device 218 may be associated with a different point-of-sale order based on consumer device 218 being near (or nearer to) communication beacon 206. In some embodiments, the distance between a consumer device and a beacon may be determined based on the signal strength of communication signals between the consumer device and the beacon.

FIG. 3 shows an example point-of-sale system including consumer device communication beacons, in accordance with some embodiments. Consumer devices may be configured to behave as communication beacons for other (e.g., peer) consumer devices. Point-of-sale system 300 may include merchant device 302. In some embodiments, merchant device 302 may include a root beacon configured to detect consumer devices within a communicable range of the root beacon. For example, the root beacon may be configured to broadcast a root beacon identifier via wireless PAN 304. In some embodiments, the root beacon and/or merchant device may be located at and/or near an entrance of the merchant shop such that each consumer devices that enters the merchant shop will come within communicable range of wireless PAN 304. In some embodiments, the root beacon may be a communication beacon where the merchant device is configured to use the beacon identifier as a root beacon identifier.

Subsequent to a consumer device (e.g., consumer device 306) being detected by the root beacon and/or receiving the root beacon identifier, the consumer device may be configured to facilitate the formation of ad hoc mesh of communications beacons for other consumer devices. For example, consumer devices 306, 314, and 316 may be each configured to broadcast a (e.g., different) beacon identifier via wireless PAN, such as wireless PAN 308 for consumer device 306. Merchant device 302 may be further configured to generate a point-of-sale order and associate consumer device 306 and/or a consumer account with the point-of-sale order. Consumer devices 310 and 312 may be associated with the point-of-sale order based on consumer device 212 being near consumer device 306 (e.g., within wireless PAN 308). Additional techniques for grouping consumers based on peer-to-peer consumer device communication beacons are discussed in connection with method 600 shown in FIG. 6.

In some embodiments, a point-of-sale system may be configured to mitigate for signal reflections, signal barriers and/or other physical characteristics of a merchant shop and/or layout that may distort the relationship between signal strength and distance for the communication signals between consumer devices and beacons. In one example, an environmental audit may be performed with stationary communication beacons located as they would in deployment (e.g., at tables and/or other locations of interest). A consumer device and/or other (e.g., Bluetooth) reader may then be brought to a sampling of locations (e.g., each location) within the merchant shop. At each location, a set of signal strengths of the communication signals between the reader and each communication beacon within communicable range may be determined. Next, the set of signal strengths may be associated with or mapped to the applicable location of interest, such as to the table within the merchant shop that is associated with the location of the set of signal strengths. Accordingly, baseline signal strengths necessary for triangulation can be flexibly determined for any merchant shop and/or communication beacon layout. Additionally or alternatively, in some embodiments, the point-of-sale system may use a Guassian Process Latent Variable Model (GP-LVM) to programmatically determine the mappings between physical locations and raw signal strength data at each communication beacon.

FIG. 4 shows a schematic block diagram of example circuitry 400, some or all of which may be included in point-of-sale system 108, merchant device 114, communication beacon 116, system 102, server 110, database 112, and/or consumer device 106. In accordance with some example embodiments, circuitry 400 may include various means, such as one or more processors 402, memories 404, communications modules 406, and/or input/output modules 408.

In some embodiments, such as when circuitry 400 is included in merchant device 114, point-of-sale module 410 may also or instead be included. As referred to herein, "module" includes hardware, software and/or firmware configured to perform one or more particular functions. In this regard, the means of circuitry 400 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments, processor 402 may comprise a plurality of processing means. The plurality of processing means may be embodied on a single computing device or may be distributed across a plurality of computing devices collectively configured to function as circuitry 400. The plurality of processing means may be in operative communication with each other and may be collectively configured to perform one or more functionalities of circuitry 400 as described herein. In an example embodiment, processor 402 may be configured to execute instructions stored in memory 404 or otherwise accessible to processor 402. These instructions, when executed by processor 402, may cause circuitry 400 to perform one or more of the functionalities described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. As another example, when processor 402 may be embodied as an executor of instructions, such as may be stored in memory 404, the instructions may specifically configure processor 402 to perform one or more algorithms, methods or operations described herein. For example, processor 402 may be configured to execute operating system applications, firmware applications, media playback applications, media editing applications, among other things.

Memory 404 may comprise, for example, volatile memory, non-volatile memory, or some combination thereof. Although illustrated in FIG. 4 as a single memory, memory 404 may comprise a plurality of memory components. The plurality of memory components may be embodied on a single computing component or distributed across a plurality of computing components. In various embodiments, memory 404 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 404 may be configured to store information, data, applications, instructions, or the like for enabling circuitry 400 to carry out various functions in accordance with example embodiments discussed herein. For example, in at least some embodiments, memory 404 may be configured to buffer input data for processing by processor 402. Additionally or alternatively, in at least some embodiments, memory 404 may be configured to store program instructions for execution by processor 402 and/or data for processing by processor 402. Memory 404 may store information in the form of static and/or dynamic information. This stored information may be stored and/or used by circuitry 400 during the course of performing its functionalities.

Communications module 406 may be embodied as any component or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, such as, for example, a second circuitry 400 and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications. Communications module 406 may be configured to receive and/or transmit any data that may be stored by memory 404 using any protocol that may be used for communications. Communications module 406 may additionally and/or alternatively be in communication with the memory 404, input/output module 408 and/or any other component of circuitry 400, such as via a bus. Communications module 406 may be configured to use one or more communications protocols such as, for example, Bluetooth, Wi-Fi (e.g., a 802.11 protocol, etc.), radio frequency systems (e.g., 900 MHz, 1.4 GHz, and 5.6 GHz communication systems), infrared, mobile broadband, GSM, GSM plus EDGE, CDMA, quadband, and other cellular protocols, VOIP, and/or any other suitable protocol. In some embodiments, such as when circuitry 400 is embodied as a communication beacon, a root beacon, and/or a consumer device communication beacon, communications module 406 may be configured to generate a wireless PAN for communication with other devices within communicable range of the wireless PAN.

Input/output module 408 may be in communication with processor 402 to receive an indication of an input and/or to provide an audible, visual, mechanical, or other output. In that sense, input/output module 408 may include means for performing analog-to-digital and/or digital-to-analog data conversions. Input/output module 408 may include support, for example, for a display, touchscreen, keyboard, button, click wheel, mouse, joystick, an image capturing device, microphone, speaker, biometric scanner, and/or other input/output mechanisms. In embodiments where circuitry 400 may be implemented as a server or database, aspects of input/output module 408 may be reduced as compared to embodiments where circuitry 400 may be implemented as an end-user machine or other type of device designed for complex user interactions. In some embodiments (like other components discussed herein), input/output module 408 may even be eliminated from circuitry 400. Alternatively, such as in embodiments wherein circuitry 400 is embodied as a server or database, at least some aspects of input/output module 408 may be embodied on an apparatus used by a user that is in communication with circuitry 400. Input/output module 408 may be in communication with memory 404, communications module 406, and/or any other component(s), such as via a bus. Although more than one input/output module and/or other component can be included in circuitry 400, only one is shown in FIG. 4 to avoid overcomplicating the disclosure (e.g., like the other components discussed herein).

In some embodiments, point-of-sale module 410 may also or instead be included and configured to perform the functionality discussed herein related to programmatically grouping consumers for consumer service. In some embodiments, some or all of the functionality of point-of-sale module 410 may be performed by processor 402. In this regard, the example processes and algorithms discussed herein can be performed by at least one processor 402 and/or promotion module 410. For example, non-transitory computer readable storage media can be configured to store firmware, one or more application programs, and/or other software, which include instructions and other computer-readable program code portions that can be executed to control processors of the components of system 400 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 402, to produce a machine, such that the computer program product includes the instructions which execute on the computer or other programmable data processing apparatus to create a means for implementing the functions specified in the flowchart block or block diagrams.

These computer program instructions may also be stored in a non-transitory computer-readable storage device (e.g., memory 404) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Programmatically Grouping Consumers

FIG. 5 shows an example of a method 500 for programmatically grouping consumers, in accordance with some embodiments. Method 500 is discussed herein with reference to FIGS. 1 and 2, although other suitable computing devices may be used in various embodiments.

Method 500 may begin at 502 and proceed to 504, where a communication beacon may be configured to broadcast a beacon identifier via a wireless personal area network (PAN). For example, the communication beacon may be located at a location of interest at a merchant shop (e.g., table 208 as shown for communication beacon 204 at a dine-in restaurant). Locations of interest may vary depending on the applicable merchant. For example, a dine-in restaurant may include tables, reservation desks, waiting rooms, seats, rooms, etc. in which consumers may gather in groups for consumer activity. In another example, a retail store may include locations of interest such as checkout lines, information kiosks, customer service, etc. As shown in FIG. 2, communication beacon 204 may be configured to broadcast a beacon identifier via wireless PAN 210 generated by communication beacon 204.

In some embodiments, a communication beacon may be configured to passively emit the beacon identifier. In some embodiments, the communication beacon may be configured to broadcast the beacon identifier using a Bluetooth protocol. For example, protocols such as Bluetooth low energy (LE) may be particularly suitable when the communication beacon is battery-powered. Where a merchant shop includes multiple communication beacons, each of the communication beacons may be configured to broadcast a different beacon identifier that uniquely identifies the beacon. In some embodiments, the beacon identifier may be changed, updated, or otherwise configured by the merchant device.

In some embodiments, a point-of-sale system may include multiple communications beacons that are each located at different locations of interest and/or each configured to broadcast different beacon identifiers. Here, the communication beacons may form a mesh of signal coverage within the locations of interest.

At 506, a merchant device may be configured to receive an indication that a consumer device received the beacon identifier from the communication beacon. In some embodiments, the merchant device may be located within the same merchant shop as the communication beacon, as shown in FIG. 2 for merchant device 202. The consumer device may be configured to receive the beacon identifier being broadcast by the communication beacon when within a communicable range of the communication beacon. For example, a consumer seating at table 208 while holding a consumer device 212 may result in the consumer device coming within communicable range of communication beacon 204. In some embodiments, the consumer device 212 may be configured to use a compatible communication protocol as the communication beacon, such as the Bluetooth version 4.0 with low energy (LE) technology. In some embodiments, the consumer device may be configured to (e.g., via executing an application in the background of an operating system) detect the presence of the nearby communication beacon. Here, the consumer device may be configured to utilize the Bluetooth LE protocol, among other things, to achieve low power communication beacon discovery.

In some embodiments, the consumer device may be further configured to provide the indication that the consumer device received the beacon identifier to the merchant device, such as directly (e.g., via a wireless PAN) or via another device(s) and/or network(s) (e.g., the communication beacon and the wireless PAN of the communication beacon, server 110 via network 104, the Internet, among other things. As such, the consumer device may be further configured to send the indication that the consumer device received the beacon identifier to the merchant device, the communication beacon, and/or a central system (e.g., system 102). The communication beacon and/or central system, when configured to receive the indication from the consumer device, may be further configured to send an appropriate indication to the merchant device.

In some embodiments, the merchant device may be configured to determine the consumer devices are nearer to the communication beacon than one or more other communication beacons. For example and with reference to FIG. 2, consumer device 214 may be associated with communication beacon 204 rather than communication beacon 206 based on signal strength of communications signals being stronger between consumer device 214 and communication beacon 204 than between consumer device 214 and communication beacon 206.

In some embodiments, where consumer device communication beacons and dedicated communication beacons are used, the merchant device may be configured to prioritize the signal strengths from consumer device communication beacons over the same or substantially the same signal strengths from dedicated communication beacons. Accordingly, in some embodiments, one or more of signal strength, extent of time that the configuration is spatially stable, and/or communication beacon type (dedicated vs. consumer device communication beacons) may be factors in determining which consumer devices should be associated with which communication beacons.

In some embodiments, the merchant device may additionally or alternatively be configured to receive an indication that the consumer device has maintained a wireless PAN connection with the communication beacon for a predetermined period of time. For example, some embodiments may track consumer device locations and/or otherwise determine stable locations of consumer devices over time as discussed in connection with method 700 and FIG. 7.

At 508, the merchant device may be configured to identify a consumer account associated with the consumer device. The consumer account, for example, may be provided to consumers by system 102 and may be associated with consumer data (e.g., stored in database 112 and sent by server 110) including consumer payment data (e.g., payment methods, credit cards, payment accounts, etc.). The merchant device may be further configured to receive consumer data from server 110 that identifies the consumer account and/or consumer. In some embodiments, consumer identification may be performed based on the merchant device and/or communication beacon being configured to receive wallet identifying data (e.g., a wallet identifying token, key, code or other identifier) from the consumer device. Here, the merchant device and/or communication beacon may be further configured to send the wallet identifying data to system 102 and receive consumer information from system 102 in response. Additional discussion regarding consumer device based consumer presence detection and identification, applicable to some embodiments, can be found in U.S. patent application Ser. No. 13/801,610, titled "Consumer Presence Based Deal Offers," filed Mar. 13, 2013, which is incorporated by reference in its entirety herein. In some embodiments, such as where consumers are not associated with a consumer account, the merchant device may be configured to generate and/or otherwise associate a placeholder account and/or other consumer indicator with the consumer device.

At 510, the merchant device may be configured to determine whether a point-of-sale order is associated with the beacon identifier. For example, an existing point-of-sale order may be associated with the beacon identifier based on the merchant device being configured to receive an indication that a first (e.g., earlier arriving) consumer device has received the beacon identifier from the communication beacon, and in response, create the point-of-sale order for the first consumer device.

In response to determining that a point-of-sale order fails to be associated with the beacon identifier, method 500 may proceed to 512, where the merchant device may be configured to create a point-of-sale order. As discussed above, the merchant device may be configured to provide point-of-sale functionality. Some examples of point-of-sale functionality may include creating orders, adding items to an order, modifying items, determining a transaction price, and/or facilitating payments (e.g., including tax and tips). In the example where the merchant device is deployed at a dine-in restaurant, the items may be menu items that may be added to the point-of-sale order (e.g., the restaurant check).

Method 500 may then proceed to 514, where the merchant device may be configured to associate the consumer account with a point-of-sale order. Similarly and returning to 510, in response to determining that a point-of-sale order has been associated with the beacon identifier, method 500 may also proceed to 514. In some embodiments, the merchant device may be additionally and/or alternatively configured to associate the consumer device with the point-of-sale order (e.g., when consumer accounts are not used or unavailable for a consumer).

In some embodiments, in response to receiving the beacon identifier, the consumer device may be configured to create a new point-of-sale order. Here, the merchant device may be configured to receive a notification and data associated with the point-of-sale order (e.g., the consumer account associated with the consumer device).

At 516, the merchant device may be configured to determine whether to facilitate a financial transaction for the point-of-sale order. For example, at a dine-in restaurant, the financial transaction may be completed upon completion of a meal or otherwise subsequent to receiving an indication from a consumer (e.g., via the consumer device or otherwise) that the consumer is ready to provide payment. In some embodiments, the merchant device may be configured to initiate the financial transactions based on the location of consumer devices. Here, for example, consumers may be automatically charged upon leaving the merchant shop (e.g., taking the consumer device outside of the communicable range of an associated communication beacon, other communication beacon, and/or among other things) without having to go through a conventional checkout procedure. In some embodiments, such as when a point-of-sale order is associated with multiple consumer accounts, the merchant device may be configured receive (e.g., from consumer devices) payment share data indicating a portion of the transaction price to be paid by a (e.g., each) consumer account. Here, the merchant device may be further configured to facilitate one or more transactions based on the payment share data. Financial transactions and/or other consumer service functionality associated with point-of-sale orders are discussed in further detail in method 800 and shown in FIG. 8.

In response to determining to not (e.g., yet) facilitate a financial transaction for the point-of-sale order, method 500 may return to 506, where the merchant device may be configured to receive indications that consumer devices received a beacon identifier. The beacon identifier may be the same beacon identifier, or alternatively, a different beacon identifier associated with a different communication beacon. Where the beacon identifier is the same, the merchant device may be configured to associate a consumer account with the associated point-of-sale order. Here, until the point-of-sale order been closed (e.g., via a financial transaction), one or more consumers may be added and/or removed from the associated consumers of the point-of-sale order. Where the beacon identifier is different, the merchant device may be configured to associate the consumer device with corresponding different point-of-sale order. In some embodiments, the merchant device may be configured to (e.g., continuously) monitor consumer devices that receive beacon identifiers and associate consumers to point-of-sale orders based on the beacon identifiers received by the consumer devices.

In response to determining to facilitate a financial transaction for the point-of-sale order and upon completion of the financial transaction, method 500 may proceed to 518, where the merchant device may be configured to disassociate the point-of-sale order with the beacon identifier. Here, a subsequent consumer device that receives the beacon identifier may be associated with a different point-of-sale order. At a dine-in restaurant, for example, a second consumer and/or consumer group may have arrived at a table subsequent to the departure of a first consumer and/or consumer group. The second consumer and/or consumer group may then be associated with a different point-of-sale order. Method 500 may then proceed to 520 and end.

FIG. 6 shows an example of a method for programmatically grouping consumers based on peer-to-peer consumer devices, in accordance with some embodiments. Method 600 is discussed herein with reference to FIGS. 1 and 3, although other suitable computing devices may be used in various embodiments.

Method 600 may begin at 602 and proceed to 604, where a root beacon may be configured to detect consumer devices within a communicable range of the root beacon. As discussed above and shown in FIG. 3, for example, the root beacon may be included within merchant device 302 and may be configured to provide wireless PAN 304. Here, consumer devices within the communicable range of wireless PAN 304 may be detected. Within a dine-in restaurant, the root beacon may be located at and/or near an entrance of the restaurant. Here, consumer devices that enter the restaurant may be detected. In some embodiments, the discussion herein regarding communication beacons may be applicable to the root beacon. For example, the root beacon may be configured to broadcast a beacon identifier that may be different from the beacon identifiers of other beacons.

At 606, the merchant device may be configured to determine a detected consumer device as a communication beacon (or "consumer device communication beacon," as used herein). In some embodiments, the consumer device may be configured to initiate communication beacon functionality in response to being detected by the root beacon. For example, the consumer device may be configured to allow the consumer (e.g., via a toggle button or other user interface), merchant device, and/or root beacon to initiate the broadcasting of a beacon identifier. Additionally and/or alternatively, the consumer may be allowed to select an existing consumer device beacon to join the associated point-of-sale order. In some embodiments, communication beacon functionality on the consumer device may be initiated at a predetermined time subsequent to the consumer device being detected by the root beacon. Here, consumers may be provided a window of time to join an existing point-of-sale order, such as by arriving within a communicable range and/or predetermined distance of another communication beacon. In some embodiments, the merchant device and/or root beacon may be configured to generate and/or otherwise determine the beacon identifier for the consumer device beacon identifier and send the beacon identifier to the consumer device for broadcasting.

At 608, the merchant device may be configured to identify a consumer account associated with the consumer device. At 610, the merchant device may be configured to associate the consumer account with a point-of-sale order. The discussion at 508 and 512 of method 500 may be applicable at 608 and 610, respectively.

At 612, the merchant device may be configured to perform method 500 with the consumer device acting as the communication beacon. For example, other consumer devices that receive the beacon identifier from the consumer device communication beacon may be associated with the point-of-sale order along with the consumer device communication beacon. Here, subsequent consumers (e.g., other party members) can connect to a point-of-sale order based on distance from one or more communication beacons (e.g., the nearest communication beacon). Additionally or alternatively, subsequent consumers can manually select the point-of-sale order, such as from a menu of potential candidate point-of-sale orders each associated with a communication beacon.

In some embodiments, the consumer associated with the first consumer device associated with the point-of-sale order may elect via the consumer device to a "leader" of a consumer group. The consumer device and/or merchant device may be configured to register a Bluetooth LE characteristic that identifies the consumer device as the leader of the point-of-sale order and another Bluetooth LE characteristic that identifies the point-of-sale order (e.g., via an order ID) in the point-of-sale system. Other consumer devices scanning for communication beacons may now read one of more of these Bluetooth LE characteristics to determine the point-of-sale order to which the consumer device should join (e.g., programmatically based on location data and/or based on consumer selection).

At 614, the merchant device may be configured to determine whether a consumer device unassociated with a communication beacon has been detected by the root beacon. The consumer device may be outside of a communicable range of one or more other consumer device communication beacons and/or outside of a predetermined distance from the one or more other consumer device communications beacons. For example, the consumer device may be located near the root beacon, such as at a lobby, entrance, waiting room, etc. of a dine-in restaurant.

In response to determining that a consumer device unassociated with a communication beacon has been detected by the root beacon, method 600 may return to 606, where the merchant device may be configured to determine the detected consumer device as a communication beacon. In response to determining that no other consumer device (e.g., unassociated with an existing communication beacon) has been detected by the root beacon, method 600 may proceed to 616 and end.

FIG. 7 shows an example of a method 700 for programmatically grouping consumers based on location, in accordance with some embodiments. The location of the consumers may be determined based on location data received from consumer devices. In some embodiments, method 700 may be performed to negotiate leadership (e.g., determine the consumer device communication beacon) and/or determine consumer grouping without consumer attention (e.g., consumer inputs received from consumer devices). In some embodiments, method 700 may have particular application in merchant shops where consumer spatially aggregate for group activity (e.g., at dine-in restaurants, bars, etc.) and where the location of consumers may be determined with high resolution to facilitate in-shop consumer service. For example, the locations of consumer devices within a merchant shop may be tracked over time. Stable (e.g., over time) spatial clusters of consumer devices may be associated with common point-of-sale orders.

Method 700 may begin at 702 and proceed to 704, where the merchant device may be configured to receive location data from consumer devices indicating the location of the consumer devices. FIG. 9 shows a floor plan of an example restaurant 900, in accordance with some embodiments. Restaurant 900 may include entrance 902, waiting area 904, wait desk 906, dine-in area 908, kitchen 910 and restroom 912. Wait desk 906 may be a table, kiosk, etc. at which root beacon 914 may be located. In some embodiments, root beacon 914 may be part of a merchant device configured to facilitate point-of-sale orders. For example, restaurant 900 may offer delivery (e.g., ordered online or through telephone), carry-out, or the like and the merchant device at wait desk 906 may be configured to facilitate such orders. Root beacon 914 may be configured to provide wireless PAN 916 and/or broadcast a root beacon identifier via wireless PAN 916. The communicable range of wireless PAN 916 is not necessarily drawn to scale in FIG. 9, and in some embodiments, may be variably configurable (e.g., via a merchant device) as desirable or suitable.

Dine-in area 908 may include multiple locations where consumers may be seated for dine-in, such as tables 918, 920 and 922. Table 918 may include communication beacon 924 and table 920 may include communication beacon 926. Communication beacon 924 may be configured to provide wireless PAN 928 and/or broadcast a beacon identifier via wireless PAN 928. Communication beacon 926 may be configured to provide wireless PAN 930 and/or broadcast a beacon identifier via wireless PAN 930. Table 922 may not include a communication beacon. As discussed above in method 600, a consumer device may be selected to function as an ad hoc communication beacon. For example, consumer device communication beacon 936 may be configured to wireless PAN 938 and/or broadcast a beacon identifier via wireless PAN 938. In restaurant 900, both dedicated communication beacons 924 and 926 and consumer device communication beacon 936 are used. In some embodiments, a point-of-sale system may be configured to use one of dedicated communication beacons or consumer device communication beacons.

Upon a consumer entering restaurant 900 at entrance 902 and/or while the consumer is near waiting area 904, a consumer device (e.g., consumer device 932) carried by the consumer may be detected by root beacon 914 via wireless PAN 916, as discussed above in connection with method 600. In some embodiments, restaurant 900 may not include a root beacon, and instead, may use dedicated communication beacons.

Upon consumers being seated at various tables (e.g., with the assistance of the wait staff or otherwise), the location of the consumer devices may be determined based on signal strength of communication signals between the consumer devices and one or more beacons (e.g., communication beacons 924 and/or 926, consumer device communication beacons, root beacon 914, location beacons (e.g., strategically located within the merchant shop to provide consumer device location triangulation), among other things). For example, stronger communication signals (e.g., communicated via the wireless PAN 928) between consumer device 934 and communication beacon 924 relative to communication signals (e.g., communicated via wireless PAN 930) between consumer device 934 and communication beacon 926 may indicate that consumer devices 934 is closer to communication beacon 924 than 926. Accordingly, the consumer device may be associated with the communication beacon 924 rather than communication beacon 926.

In some embodiments, the location of the consumer device may be determined based on communication signals between the consumer device and three or more beacons (e.g., root beacon 914, communication beacon 924, communication beacon 926 and/or consumer device communication beacon 936. For example, the signal strength of the consumer device with respect to each beacon and known locations of each beacon may be used to triangulate the location of the consumer device. In some embodiments, the point-of-sale system may include one or more location beacons that may be disposed within the merchant shop for the purpose of consumer device triangulation and location determination. In some embodiments, a root beacon, merchant device, and/or communication beacon may also be used as a location beacon for consumer device location determination.

Returning to FIG. 7, at 706, the merchant device may be configured to identify a stable spatial cluster of consumer devices over time based on the location data. For example, the location of a consumer device may be determined to be stable over time based on the location data indicating that the consumer device has not substantially changed location for a predetermined period of time (e.g., 5 minutes). Returning to restaurant 900, consumers that are seated at table 918 for dine-in may remain at and/or near table 918 for the predetermined period of time with their consumer devices. Here, each of the consumer devices 934, 940, and 942 may be identified as the stable spatial cluster of consumer devices over time. Consumer devices 936 and 946 may also be identified as a stable cluster of consumer devices over time. Consumer device 948, being the only consumer device nearest to communication beacon 926, may be identified as a stable spatial cluster including only a single consumer device.

In some embodiments, the merchant device may be configured to execute an ad hoc clustering algorithm to identify the spatial clusters of consumer devices based on the location data. For example, consumer device 944 held by a consumer walking across dine-in area 908 to restroom 912 may not be associated with wireless PAN 938 despite being temporarily (e.g., for less than the predetermined time) within communicable range of wireless PAN 938 and/or nearest to beacon 936. In some embodiments, the consumer devices may be configured to provide a confirmation and/or other data indicating the appropriate point-of-sale order. Upon receiving confirmation (e.g., from one or more consumer devices of a party) of the consumers and/or consumers accounts of a point-of-sale order and/or based on having identified a stable cluster, the consumer device associated with the confirmed group may be allowed to traverse freely (e.g., to restroom 912) without further affecting group membership (e.g., with other point-of-sale orders).

In some embodiments, such as where consumer device communication beacons are used, the merchant device may be configured to programmatically determine (e.g., based on the location data) one or more consumer device communication beacons and associate other consumer devices with the one or more consumer device communication beacons. For example, a first (e.g., centrally located) consumer device of the stable spatial cluster of consumer devices may be selected as a communication beacon and the other consumer devices may be associated with the beacon identifier of the communication beacon. Here, a programmatic technique may be employed such that consumers not need to initiate the broadcasting of a beacon identifier and/or select existing consumer device beacon to join an associated point-of-sale order, as described herein for some embodiments. In some embodiments, consumer inputs received from consumer devices may be used to confirm, update and/or modify the consumer device grouping determined based on the location data.

In some embodiments, the merchant device may be configured to determine consumer device communication beacons based on the location of consumer devices such that the consumer device communication beacons form an ad hoc mesh of signal coverage at locations of interest (e.g., within a merchant shop). For example, the consumer device including consumer device communication beacon 936 may be selected as the communication beacon based on wireless PANS 928 and 930 failing to provide sufficient communication beacon wireless signal coverage for table 922. In another example, a consumer device communication beacon may be determined to have moved (e.g., such as when a consumer carrying the consumer device communication visits restroom 912 or otherwise leaves dine-in area 908). Here, the merchant device may be configured to determine a different consumer device as a consumer device communication beacon and/or otherwise account for the movement of the consumer device communication beacon (e.g., by disabling broadcasting of beacon identifier, ignoring indications of the beacon identifier being received from consumer devices, etc.).

In some embodiments, where triangulation is used for location determination, the merchant device may be configured to select and/or otherwise determine consumer device communication beacons such that at least three location beacons are available for location data determination.

At 708, the merchant device may be configured to identify consumer accounts associated with the stable spatial cluster of consumer devices. The discussion at 508 of method 500 may be applicable at 708.

At 710, the merchant device may be configured to associate the consumer accounts with a point-of-sale order. The discussion at 512 and 514 of method 500 may be applicable at 710. Method 700 may then proceed to 712 and end.

FIG. 8 shows an example of a method 800 for facilitating a financial transaction, in accordance with some embodiments. Some or all the steps of method 800 may be performed after one or more consumers have been associated with a point-of-sale order, such as described above in connection with methods 500, 600 and/or 700, and/or using any other suitable techniques (e.g., via merchant input to the merchant device).

Method 800 may begin at 802 and proceed to 804, where the merchant device may be configured to associate the beacon identifier of a communication beacon with the location of the communication beacon. For example, where dedicated communication beacons are used at a merchant shop, the beacon identifiers for each communication beacon may be associated with the locations at which the communication beacons are physically located. As shown in FIG. 9, for example, communication beacon 924 may be associated with table 918 at restaurant 900 where communication beacon 924 may be located. In some embodiments, the merchant device may be configured to generate and/or access a mapping between beacon identifiers and real-world locations, tables, seats, areas, etc.

In some embodiments, the location of the communication beacon and/or associated consumer devices may be used facilitate consumer service. Some examples may include the wait staff being directed to the location where consumers are seated to take orders and requests, refill drinks, deliver prepared items, among other things. For example, upon determining that consumer device 944 associated with communication beacon 926 has left table 920 (e.g., to visit restroom 912), prepared items from kitchen 910 may be temporarily delayed until consumer device 944 is determined to have returned to table 920.

In some embodiments, the merchant device may be configured to receive consumer information (e.g., from system 102) associated with consumer accounts. The consumer information, for example, may be configured to facilitate customized dining service. For example, the consumer information may include menu item purchase history data and/or consumer preferences (e.g., allergies, favorites, etc.) to facilitate the offering of recommended menu items. In another example, the consumer information may indicate one or more promotions purchased by the consumer that are redeemable at the merchant shop to facilitate the redemption of the one or more promotions. Additional discussion regarding techniques for providing consumer service based on consumer device location and/or consumer information, applicable to some embodiments, may be found in U.S. patent application Ser. No. 13/794,529, titled "Consumer Device Based Point-of-Sale," filed Mar. 11, 2013, which is incorporated by reference in its entirety herein.

At 806, the merchant device may be configured to associate menu items with the point-of-sale order. A "menu item," as used herein, may refer to a product, service, and/or experience offered by the merchant to consumers. In some embodiments, the merchant device may be configured to allow a merchant to select the menu items from a menu interface. The merchant device may be located at a checkout of a retail shop or at a wait desk for a dine-in restaurant (e.g., wait desk 906 of restaurant 900 shown in FIG. 9). Where the merchant device is a mobile device such as a smartphone or tablet, a merchant may carry the mobile device to the location of the consumer devices and/or communication beacon associated with the point-of-sale order to take consumer orders. For example, merchant device 950 as shown in FIG. 9 may be carried to table 918 to take consumer orders.

Some embodiments may provide for consumer self-ordering via a consumer device. For example, the consumer device may be provided a menu interface configured to receive consumer selection of the menu items. In various embodiments, the menu interface may be provided to the consumer device by the merchant device, a beacon, and/or by system 102 (e.g., via network 104). The consumer device may be further configured to generate order data indicating one or more selected menu items and send the order data to the merchant device. In some embodiments, a menu interface may be configured to allow modifications to a selected menu item. For example, the menu interface may allow a consumer may order a cheeseburger with modifications such as extra bacon or no tomatoes.

At 808, the merchant device may be configured to determine a transaction price for the point-of-sale order. For example, the transaction price may be determined based at least in part on the prices of each of the menu items associated with the point-of-sale order. Upon consumers being finished with their meal at restaurant 900, the transaction price may be provided to the consumers via the consumer devices and/or via a restaurant check. The consumers may then be allowed to provide payment for at least the transaction price using consumer devices. Additionally or alternatively, consumers may be allowed to provide some or all of the payment using cash, credit card, debit card, check, etc. Whether a consumer device is used or otherwise, payment may be provided at wait desk 906, while the consumers are seated, and/or automatically upon consumers leaving the merchant shop.

At 810, the merchant device may be configured to receive payment share data indicating a portion of the transaction price to be paid by a consumer account. For example, the payment share data may be received from a consumer device associated with the point-of-sale order. In some embodiments, the merchant device may be further configured to send order data indicating selected menu items and the transaction price to the consumer device. In response, the consumer device may be configured to provide an item claim interface configured to allow a consumer to select one or more menu items associated with the point-of-sale order for payment. In some embodiments, the item claim interface may include a single consumer input (e.g., one-click) opt-in for specific menu items. Here, the consumer device may be configured to generate the payment share data indicating one or more menu items of the point-of-sale order to be paid for by the consumer account associated with the consumer device. In some embodiments, the merchant device may be further configured to determine the portion of the transaction price based on the payment share data. For example, the portion of the transaction price may be determined based at least in part on the price of the one or more menu items selected by the consumer for payment. In some embodiments, the merchant device may be configured to receive payment share data from each of the consumer devices associated with the point-of-sale order.

In some embodiments, the merchant device may be configured to split the costs of any unclaimed items in the point-of-sale order among the consumer accounts. Here, each divided share of the unclaimed costs may be added to the portion of the transaction price.

At 812, the merchant device may be configured to facilitate a payment for at least the portion of the transaction price to be paid by the consumer account. For example, the payment may include a final payment amount that includes the portion of the transaction price (e.g., for the menu items ordered by the consumer), a tip amount (e.g., which may be provided via the consumer device either programmatically via consumer configuration and/or based on consumer inputs), applicable taxes and/or other fees. In some embodiments, the final payment amount may also be reduced in accordance with the electronic redemption of a purchased promotion. For example, a coupon value of the promotion, or the like, could be deducted from the final payment amount. In some embodiments, the tip amount may be received from the consumer device after the initial payment of a final amount minus the tip amount has been completed and/or after the payment share data has been received from the consumer device at 810.

In some embodiments, secure consumer device payment techniques may be used. For example, the merchant device may be configured to provide payment amount data to the consumer device indicating the final payment amount. The consumer device may be configured to generate secured payment approval data (e.g., such by signing the payment amount data or other payment approval data with a wallet identifying token securely shared with system 102 or other payment server) for the final payment amount (which may or may not include an additional tip amount) and to provide the secured payment approval data to the merchant device. The merchant device may then send the secured payment approval data and payment amount data to server 110 (e.g., of system 102) or other payment server to facilitate the financial transaction. For example, server 110 may be configured to generate secured payment approval data by signing the payment amount data with a stored wallet identifying token and comparing the generated secured payment approval data against the one received from the merchant device. Upon successful authentication of the received data, server 110 may be configured to send the payment amount data with payment data of the consumer (e.g., associated via the consumer account) to a financial server, such as a server associated with the Automated Clearing House (ACH) for United States transactions. Additional discussion regarding secured consumer device payments, applicable to some embodiments, may be found in U.S. patent application Ser. No. 13/764,753, titled "Consumer Device Token Management," filed Feb. 11, 2013, and U.S. patent application Ser. No. 13/801,520, titled "Peer-to-Peer Payment Processing," filed Mar. 13, 2013, which are each incorporated by reference in their entirety herein, and U.S. patent application Ser. No. 13/801,610, incorporated by reference above.

In some embodiments, the merchant device may be configured to facilitate payments for appropriate portions of the transaction price for each consumer account associated with the point-of-sale order.

In some embodiments, the point-of-sale system may be configured to provide automated payments that do not require explicit consumer approval for each transaction. For example, the merchant device may be configured to determine whether the consumer device has failed to be within a communicable range of a wireless PAN (e.g., one or more of the beacons at the merchant shop) for a predetermined period of time. In response to determining that the consumer device has failed to be within the communicable range of the wireless PAN for the predetermined period of time, the merchant device may be configured to facilitate a payment for a at least a portion of the transaction price by the consumer account associated with the consumer device. In some embodiments, the consumer device may be configured to allow consumers to set automatic tip amounts (e.g., 15%, 20%, etc.). Here, the merchant device may be configured to receive tip data indicating the automatic tip amount and facilitate a payment including the automatic tip amount.

In some embodiments, the merchant device and/or server 110 may be configured to send a request for a review and/or rating of the merchant to the consumer device. The consumer device may be configured to provide an interface for providing the review and for sending the associated data to the merchant device and/or system 102, such as via network 104.

At 814, the merchant device may be configured to facilitate a second payment for at least a second portion of the transaction price that is unclaimed by the consumer accounts. For example, the unclaimed portions of the transaction price may not be split between consumer accounts in all instances, such as when there is a consumer that does not have a consumer device. Here, the merchant device may be configured to generate one or more restaurant checks that may be paid by cash, credit card, debit card, etc. Method 800 may then proceed to 816 and end.

FIG. 10 shows an example of a method 1000 for facilitating shared payment for a point-of-sale order, in accordance with some embodiments. For example, method 1000 may be performed to allow a consumer to share a redeemable promotion with other consumers of a consumer group (e.g., consumers associated with the point-of-sale order via their consumer devices) that can be applied toward one or more payments by the consumers of the consumer group. As such, some or all the steps of method 1000 may be performed after one or more consumers (e.g., via their consumer devices) have been associated with a point-of-sale order, such as described above in connection with methods 500, 600 and/or 700, and/or using any other suitable techniques (e.g., via merchant input to the merchant device, consumer input via consumer device(s), etc.).

In some embodiments, some or all of the steps of method 1000 may be performed by a merchant device, such as merchant device 114. Alternatively or additionally, some or all of the steps of method 1000 may be performed by a central system, such as server 110 of promotion and marketing system 102 and/or other system configured to provide point-of-sale functionality to client point-of-sale systems. Here, the point-of-sale data indicating associations between consumer accounts and point-of-sale orders may be sent to server 110 from merchant device 114 and/or communication beacon 116 or otherwise determined by server 110 (e.g., based on the location data of consumer devices, communication signals between consumer devices and communication beacons, etc.). For clarity, method 1000 is described as being performed by a merchant device.

Method 1000 may begin at 1002 and proceed to 1004, where the merchant device may be configured to provide a transaction price for the point-of-sale order to a consumer device associated with a consumer. The discussion at 804-808 of method 800 may be applicable at 1004. For example, the transaction price may be determined based at least in part on the prices of each of the menu items associated with the point-of-sale order. In some embodiments, transaction price for the point-of-sale order may further include a tax amount.

In some embodiments, the merchant device may be configured to receive tip data indicating a tip amount from the consumer device. The tip data, for example, may indicate a percentage of the transaction price with which the tip amount may be determined or may indicate the tip amount as a (e.g., monetary, credit, etc.) value. The merchant device may be further configured to determine a final transaction price for the point-of-sale order that may include any applicable tax amounts and/or tip amounts.

At 1006, the merchant device may be configured to provide redeemable promotions to the consumer device. For example, the merchant device may be configured to request consumer data from server 110 indicating promotions that can be redeemed by the consumer account associated with the consumer device. The merchant device may then provide the consumer data to the consumer device. In another example, server 110 may be configured to provide the consumer data to the consumer device, such as in response to receiving point-of-sale order data from the merchant device and/or a request from the consumer device.

In some embodiments, the merchant device and/or server 110 may be configured to provide the consumer data to the consumer device programmatically based on various commercial events. For example, redeemable promotions may be provided to the consumer device in connection with providing a menu for ordering items. In another example, redeemable promotions may be provided to the consumer device in connection with performing a payment.

FIG. 11 shows an example redeemable promotion display 1100, in accordance with some embodiments. Redeemable promotion display 1100 may be an example consumer interface that includes consumer data indicating redeemable promotions. In some embodiments, redeemable promotion display 1100 may be provided to a consumer device for consumer selection of redemption for one or more redeemable promotions.

Redeemable promotion display 1100 may include a listing of redeemable promotions. A redeemable promotion may include a promotion that has been purchased (such as by providing an accepted value) and/or otherwise accepted by the consumer, such as promotion 11002. The listing of redeemable promotions may be listed and/or ranked based on various criteria. In some embodiments, promotions applicable to the merchant shop in which the consumer is located may be presented. In some embodiments, in response to the consumer selecting nearby button 1104, the consumer device may be provided with one or more redeemable promotions that are nearest or within a predetermined distance to the consumer (e.g., as may be determined based on location data received from the consumer device). In response to the consumer selecting expiring button 1104, the consumer device may be provided with one or more redeemable promotions that are closest in time or within a predetermined time to their expiration dates. In response to consumer selecting recent button 1108, the consumer device may be provided with one or more redeemable promotions that have been most recently purchased and/or purchased within a predetermined time, as shown in recent promotion listing 1110.

In some embodiments, in response to the consumer selecting a promotion (e.g., promotion 1102) in redeemable promotion display 1100, the merchant device and/or server 110 may be configured to provide promotion data associated with the selected promotion to the consumer device. FIG. 12 shows an example promotion detail display 1200, in accordance with some embodiments. Promotion detail display 1200 may include a display of the promotion data associated with a selected promotion, such as promotion 1102. For example, promotion data display 1200 may include promotion image 1202, expiration date 1204, merchant name 1206, merchant location(s) display 1208, and merchant address 1210. In some embodiments, promotion data display 1200 may include an indication of price related parameters of the promotion, such as redemption value 1212, promotional value 1214, and accepted value 1216. As shown, promotion 1102 includes an accepted value of $10 (e.g., a cost to purchase the promotion and/or the price previously paid by the consumer to purchase the promotion), a promotional value of $10 (e.g., the value of the resultant instrument beyond the accepted value), and a redemption value of $20 (e.g., the value of the resultant instrument including the accepted value and the promotional value). Promotion detail display 1200 may further include view instrument button 1218. In response to the consumer selecting view instrument button 1218, an instrument for the promotion (e.g., as shown in FIG. 13) and/or interfaces that facilitate promotion redemption may be provided to the consumer device.

Returning to FIG. 10, at 1008, the merchant device may be configured to determine whether to redeem a promotion. For example, the merchant device may be configured to receive redemption data from the consumer device indicating the redemption of one or more redeemable promotions. FIG. 13 shows an example promotion instrument display 1300, in accordance with some embodiments. Promotion instrument display 1300 may be provided to the consumer device, such as in response to the consumer selecting view instrument button 1218 in promotion detail display 1200 and/or otherwise in response to receiving a request from the consumer device. Promotion instrument display 1300 may include instrument 1302 and redeem promotion selection 1304. In some embodiments, instrument 1302 may include barcode identifier 1306 (e.g., as may be read by a barcode reader) and/or promotion identifier 1308, which may each include data that uniquely identifies the redeemable promotion. In some embodiments, in response to the consumer selecting redeem promotion button 1304, redemption data indicating consumer intent to redeem the promotion may be sent to the merchant device and/or server 110. Accordingly, the merchant device and/or server 110 may be configured to determine to redeem the promotion based on the redemption data received from the consumer device.

In response to determining to redeem a promotion at 1008, method 1000 may proceed to 1010, where the merchant device may be configured to determine a redemption value, promotional value, and accepted value for the promotion. As discussed above, promotion data that defines the promotion and the redemption value, promotional value, and/or accepted value may be stored in system 102, such as database 114. The merchant device may be configured to receive the promotion data from server 110.

At 1012, the merchant device may be configured to determine whether to share the promotion with other consumers, such as the other consumers of the consumer group associated with the point-of-sale order. For example, an indication to share the promotion and/or sharing parameters may be provided by the consumer that purchased the promotion, such as via the consumer device. For example, the consumer may be allowed to share some or all of the redemption value of the promotion with one or more other consumers.

In some embodiments, the merchant device may be configured to receive share mode data indicating a selection of a preconfigured share mode, each having different parameters. The consumer may be allowed select from one or more preconfigured share modes via the consumer device. For example, a share mode may specify that the redemption value is to be split equally among each of the consumers associated with the point-of-sale order. In another example, a share mode (or "friendly mode," as shown in FIG. 14) may that specify that the consumer is to receive the accepted value of the promotion while the other consumers split (e.g., equally) the promotional value of the promotion.

FIG. 14 shows an example split-the-bill display 1400, in accordance with some embodiments. Split-the-bill display 1400 may include friendly mode ON/OFF toggle button 1402 configured to allow the consumer to enable or disable the friendly mode share mode. Although the friendly mode share mode is shown in FIG. 14 (e.g., as being toggled on), in various embodiments, one or more other preconfigured share modes may be included and may be selectable (e.g., via radio buttons) by the consumer. In some embodiments, the merchant device may be configured determine whether to share the promotion with other consumers based on the selection (e.g., "ON" or "OFF") of friendly mode ON/OFF toggle button 1402, or the like.

In some embodiments, split-the-bill display 1400 may further include bill details display 1404 and payment details display 1406. Bill details display 1404 may include point-of-sale data associated with the point-of-sale order, such as preliminary transaction price 1404 (e.g., including the prices of one or more menu items and, in some examples, a tax amount), redemption value of the shared promotion 1406 (e.g., in some embodiments, the accepted and/or promotional values may also be shown), tip amount 1410 (selectable by the consumer), final transaction price 1412, and party size 1404. In some embodiments, one or more of the entries within bill details display 1404 may be programmatically determined by the merchant device. In some embodiments, the consumer may be allowed to change one or more of the programmatically determined entries. For example, the consumer may be allowed to specify tip amount and party size, among other things via split-the-bill display 1400.

Returning to FIG. 10, in response to determining to share the promotion at 1012, method 1000 may proceed to 1014, where the merchant device may be configured to determine a payment share amount of the consumer. For example, the payment share amount of the consumer may be determined based on the share parameters and/or share mode selected by the consumer. Where friendly mode is selected, the payment share amount of the consumer may be determined by applying the accepted value of the promotion.

With reference to FIGS. 12 and 14, for example, promotion 1102 may include a redemption value of $20, a promotional value of $10, and an accepted value of $10. The merchant device may be configured to determine the party size (e.g., programmatically based on the location data of consumers and/or beacon identifiers or via consumer input). Next, the merchant device may be configured to divide final transaction price 14012 (e.g., $121.60 as shown in FIG. 14) by the party size (e.g., 3), to arrive at preliminary payment shares of $40.53 for each of the three consumers. The merchant device may be further configured to deduct the accepted value of $10 from the preliminary payment share of the consumer sharing the promotion to arrive at a payment share amount of $30.53, which is shown at consumer payment share amount 1416 of payment details 1406.

Returning to FIG. 10, at 1016, the merchant device may be configured to determine payment share amounts of the one or more other consumers associated with the point-of-sale order. The payment share amounts of the one or more other consumers may be determined based on the share parameters and/or share mode selected by the sharing consumer. Where friendly mode is selected, the payment share amount of the one or more other consumers may be determined by applying the promotional value of the promotion.

For example, the merchant device may be configured to deduct the promotional value of $10 from the preliminary payment shares of the one or more other consumers to arrive at a payment share amounts of $35.53 for each of the one or more other consumers, shown at consumer friend payment share amount 1418 of payment details 1406.

Returning to FIG. 10, in response to determining to not share the promotion with other consumers at 1012, method 1000 may proceed to 1018, where the merchant device may be configured to determine payment share amounts of other consumers without applying a portion of the redemption value. For example, the merchant device may be configured to divide final transaction price 14012 (e.g., $121.60 as shown in FIG. 14) by the party size (e.g., 3), to arrive at preliminary payment shares of $40.53 for each of the three consumers. For the other consumers, the promotion is not applied such that each of the other consumers will pay the preliminary payment share of $40.53.

FIG. 15 shows an example split-the-bill display 1500, in accordance with some embodiments. The discussion above regarding split-the-bill display 1400 may be applicable to split-the-bill display 1500. In split-the-bill display 1500, friendly mode ON/OFF toggle button 1402 has been toggled off. Here, the merchant device may be configured to not share the promotion and may further be configured to provide an indication of the payment share amounts of other consumers without applying a portion of the redemption value, such as the payment share amount of $40.53 shown at consumer friend payment share amount 1504.

At 1020, the merchant device may be configured to determine a payment share amount of the consumer by applying the redemption value of the promotion. For example, redemption value 1212 of $20 may be deducted from the preliminary payment share of $40.53 for the non-sharing, promotion redeeming consumer to arrive at a payment share amount of $20.53, as shown at consumer payment share amount 1506.

Returning to 1008, in response to determining to not redeem a promotion, method 1000 may proceed to 1022, where the merchant device may be configured to determine payment share amounts of the consumers associated with the point-of-sale order without promotion redemption. For example, the merchant device may be configured to divide final transaction price 14012 of $121.60 (e.g., as shown in FIG. 14) by the party size 1414 of 3, to arrive at payment amount shares of $40.53 for each of the three consumers.

At 1024, the merchant device may be configured to provide the payment share amounts to one or more consumer devices associated with the point-of-sale order. For example, the payment share amounts may be provided via one or more of split-the-bill displays 1400 and/or 1500, among other things (e.g., text, email, etc.).

At 1026, the merchant device may be configured to facilitate financial transactions for the payment share amounts. The discussion at 812-814 of method 800 may be applicable at 1026. The financial transactions may be performed using any suitable technique including cash, credit card, debit card, etc. In some embodiments, payments may be performed via the consumer device and/or associated consumer account. For example, the merchant device may be configured to facilitate the financial transaction for the consumer based on the consumer selecting pay button 1508 in split-the-bill display 1500. Method 1000 may then proceed to 1028 and end.

CONCLUSION

Many modifications and other embodiments will come to mind to one skilled in the art to which these embodiments pertain having the benefit of the teachings presented in the foregoing descriptions and the associated drawings. For example, the discussion herein regarding dine-in restaurants may be extended to other types of merchants in which consumers gather and/or are served in groups at the merchant shop. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for programmatically facilitating a shared payment, the apparatus comprising at least one processor and at least one memory including computer program code, the at least one memory and the computer program code configured to, with the at least one processor, cause the apparatus to:
   receive location data from a plurality of consumer devices;
   identify a stable spatial cluster of consumer devices from the plurality of consumer devices based on the location data;
   select a first consumer device of the stable spatial cluster of consumer devices to serve as a communication beacon;
   initiate broadcast of a beacon identifier from the communication beacon;
   receive one or more indications from other consumer devices of the stable spatial cluster of consumer devices in response to the broadcasted beacon identifier;
   retrieve consumer account records associated with the first consumer device and the other consumer devices of the stable spatial cluster of consumer devices;
   receive a point-of-sale order;
   associate the consumer account records with the point-of-sale order;
   determine a transaction price for the point-of-sale order;
   determine, based on at least the transaction price, a payment share amount associated with each of the consumer account records; and
   finalize the point-of-sale order by facilitating a payment for each payment share amount from a respective consumer account of the consumer account records.

2. The apparatus of claim 1, wherein receiving the location data from the plurality of consumer devices comprises tracking respective locations of the plurality of consumer devices within a merchant shop over a predetermined period of time.

3. The apparatus of claim 1, wherein upon receiving a respective indication from a respective consumer device of the stable spatial cluster of consumer devices the respective consumer device is able to move within a merchant shop and remain associated with the stable spatial cluster of consumer devices.

4. The apparatus of claim 1, wherein the point-of-sale order includes one or more unclaimed items, and wherein a portion of unclaimed costs associated with the one or more unclaimed items is automatically added to the payment share amount associated with each of the consumer account records.

5. The apparatus of claim 1, in an instance the first consumer device serving as the communication beacon for the stable spatial cluster of consumer devices is determined to have moved, a second consumer device from the other consumer devices of the stable spatial cluster of consumer devices is selected to serve as a new communication beacon.

6. The apparatus of claim 1, wherein the communication beacon is configured to generate a mapping of real-world locations with a merchant shop.

7. The apparatus of claim 1, wherein finalizing the point-of-sale order further comprises receiving each payment for each payment share amount.

8. The apparatus of claim 1, wherein the selection of the first consumer device of the stable spatial cluster of consumer devices to serve as the communication beacon comprises registering the first consumer device with a Bluetooth LE characteristic that identifies the consumer device as the leader of the point-of-sale order.

9. A non-transitory computer readable storage medium comprising instructions for programmatically facilitating a shared payment, when executed by a processor, cause an apparatus comprising at least one processor and at least one memory to:
  receive location data from a plurality of consumer devices;
  identify a stable spatial cluster of consumer devices from the plurality of consumer devices based on the location data;
  select a first consumer device of the stable spatial cluster of consumer devices to serve as a communication beacon;
  initiate broadcast of a beacon identifier from the communication beacon;
  receive one or more indications from other consumer devices of the stable spatial cluster of consumer devices in response to the broadcasted beacon identifier;
  retrieve consumer account records associated with the first consumer device and the other consumer devices of the stable spatial cluster of consumer devices;
  receive a point-of-sale order;
  associate the consumer account records with the point-of-sale order;
  determine a transaction price for the point-of-sale order;
  determine, based on at least the transaction price, a payment share amount associated with each of the consumer account records; and
  finalize the point-of-sale order by facilitating a payment for each payment share amount from a respective consumer account of the consumer account records.

10. The non-transitory computer readable storage medium of claim 9, wherein receiving the location data from the plurality of consumer devices comprises tracking respective locations of the plurality of consumer devices within a merchant shop over a predetermined period of time.

11. The non-transitory computer readable storage medium of claim 9, wherein upon receiving a respective indication from a respective consumer device of the stable spatial cluster of consumer devices the respective consumer device is able to move within a merchant shop and remain associated with the stable spatial cluster of consumer devices.

12. The non-transitory computer readable storage medium of claim 9, wherein the point-of-sale order includes one or more unclaimed items, and wherein a portion of unclaimed costs associated with the one or more unclaimed items is automatically added to the payment share amount associated with each of the consumer account records.

13. The non-transitory computer readable storage medium of claim 9, in an instance the first consumer device serving as the communication beacon for the stable spatial cluster of consumer devices is determined to have moved, a second consumer device from the other consumer devices of the stable spatial cluster of consumer devices is selected to serve as a new communication beacon.

14. The non-transitory computer readable storage medium of claim 9, wherein the communication beacon is configured to generate a mapping of real-world locations with a merchant shop.

15. The non-transitory computer readable storage medium of claim 9, wherein finalizing the point-of-sale order further comprises receiving each payment for each payment share amount.

16. The non-transitory computer readable storage medium of claim 9, wherein the selection of the first consumer device of the stable spatial cluster of consumer devices to serve as the communication beacon comprises registering the first consumer device with a Bluetooth LE characteristic that identifies the consumer device as the leader of the point-of-sale order.

17. A machine-implemented method for programmatically facilitating a shared payment, comprising:
  receiving location data from a plurality of consumer devices;
  identifying a stable spatial cluster of consumer devices from the plurality of consumer devices based on the location data;
  selecting a first consumer device of the stable spatial cluster of consumer devices to serve as a communication beacon;
  initiating broadcast of a beacon identifier from the communication beacon;
  receiving one or more indications from other consumer devices of the stable spatial cluster of consumer devices in response to the broadcasted beacon identifier;
  retrieving consumer account records associated with the first consumer device and the other consumer devices of the stable spatial cluster of consumer devices;
  receiving a point-of-sale order;
  associating the consumer account records with the point-of-sale order;
  determine a transaction price for the point-of-sale order;
  determining, based on at least the transaction price, a payment share amount associated with each of the consumer account records; and
  finalizing the point-of-sale order by facilitating a payment for each payment share amount from a respective consumer account of the consumer account records.

18. The machine-implemented method of claim 17, wherein receiving the location data from the plurality of consumer devices comprises tracking respective locations of the plurality of consumer devices within a merchant shop over a predetermined period of time.

19. The machine-implemented method of claim 18, wherein upon receiving a respective indication from a respective consumer device of the stable spatial cluster of consumer devices the respective consumer device is able to move within a merchant shop and remain associated with the stable spatial cluster of consumer devices.

20. The machine-implemented method of claim 17, wherein the point-of-sale order includes one or more unclaimed items, and wherein a portion of unclaimed costs associated with the one or more unclaimed items is automatically added to the payment share amount associated with each of the consumer account records.

* * * * *